(12) United States Patent
Jukoff et al.

(10) Patent No.: US 6,619,347 B2
(45) Date of Patent: Sep. 16, 2003

(54) COMBINATION WORKPIECE POSITIONING/HOLD-DOWN AND ANTI-KICKBACK DEVICE FOR A WORK TABLE

(75) Inventors: Peter Jukoff, 84-04 108th St., Richmond Hill, NY (US) 11418-1217; Ethan Dean, Pinckney, MI (US)

(73) Assignee: Peter Jukoff, Richmond Hill, NY (US)

( * ) Notice: Subject to any disclaimer, the term of this patent is extended or adjusted under 35 U.S.C. 154(b) by 0 days.

(21) Appl. No.: 10/211,076

(22) Filed: Aug. 2, 2002

(65) Prior Publication Data

US 2003/0051768 A1 Mar. 20, 2003

Related U.S. Application Data

(63) Continuation-in-part of application No. 09/977,119, filed on Oct. 12, 2001, now Pat. No. 6,446,687, which is a continuation-in-part of application No. 09/482,772, filed on Jan. 13, 2000, now Pat. No. 6,315,016.
(60) Provisional application No. 60/115,932, filed on Jan. 14, 1999.

(51) Int. Cl.[7] .............................. B27B 31/00; B27C 1/12
(52) U.S. Cl. ..................... 144/253.6; 83/446; 83/448; 83/450; 144/253.2; 144/253.5
(58) Field of Search ..................... 144/134.1, 135.2, 144/253.1, 253.2, 253.5, 253.6, 253.8; 83/444, 446, 447, 425, 437, 448, 450

(56) References Cited

U.S. PATENT DOCUMENTS

| | | |
|---|---|---|
| 87,700 A | 3/1869 | Pagett |
| 227,876 A | 5/1880 | Blair |
| 363,016 A | 5/1887 | Stalter |
| 481,983 A | 9/1892 | Thom |
| 1,022,176 A | 4/1912 | Boothby |
| 1,316,051 A | 9/1919 | Linderman |
| 1,563,388 A | 12/1925 | Mattison et al. |
| 2,612,914 A | 10/1952 | Reynolds |
| 2,722,247 A | 11/1955 | Schroeder et al. |
| 2,747,628 A | 5/1956 | Ford |
| 2,783,796 A | 3/1957 | Patterson |
| 3,457,972 A | 7/1969 | Johnson |
| 3,738,403 A | 6/1973 | Schwoch et al. |
| 4,294,151 A | 10/1981 | Lemus |
| 4,469,318 A | 9/1984 | Slavic |
| 4,476,757 A | 10/1984 | Morris |
| 4,499,933 A | 2/1985 | Thompson |
| 4,603,612 A | 8/1986 | Atkins |
| 4,974,650 A | 12/1990 | Varley |
| 4,976,298 A | 12/1990 | Gibson |
| 5,058,474 A | 10/1991 | Herrera |
| 5,301,726 A | 4/1994 | Wojcik |

Primary Examiner—W. Donald Bray
(74) Attorney, Agent, or Firm—Frishauf, Holtz, Goodman & Chick, P.C.

(57) ABSTRACT

A combination workpiece positioning, hold-down and anti-kickback device for a work table having a fence against which a workpiece is guided, includes a non-rotatable positioning member having an arcuate cam surface at one edge for engaging a side surface of a workpiece on the work table; an adjustment device for moving the positioning member in lengthwise and transverse directions relative to the workpiece and for locking the same thereat; a pivot pivotally mounting the positioning member to the adjustment device; a spring for biasing the positioning member in a pivot direction into engagement with the side surface of the workpiece; a non-rotatable hold-down member having a second arcuate cam surface at one edge for engaging an upper surface of the workpiece; an adjustment device for moving the hold-down member in lengthwise, transverse and vertical directions relative to the workpiece, and for locking the same thereat; a pivot pivotally mounting the hold-down member to the second adjustment device; and a second spring for biasing the hold-down member in a second pivot direction into engagement with the upper surface of the workpiece.

32 Claims, 23 Drawing Sheets

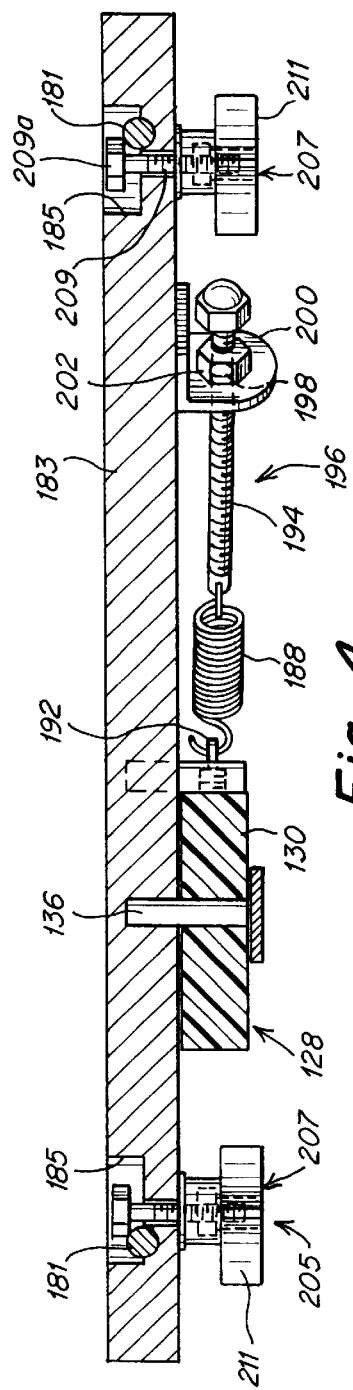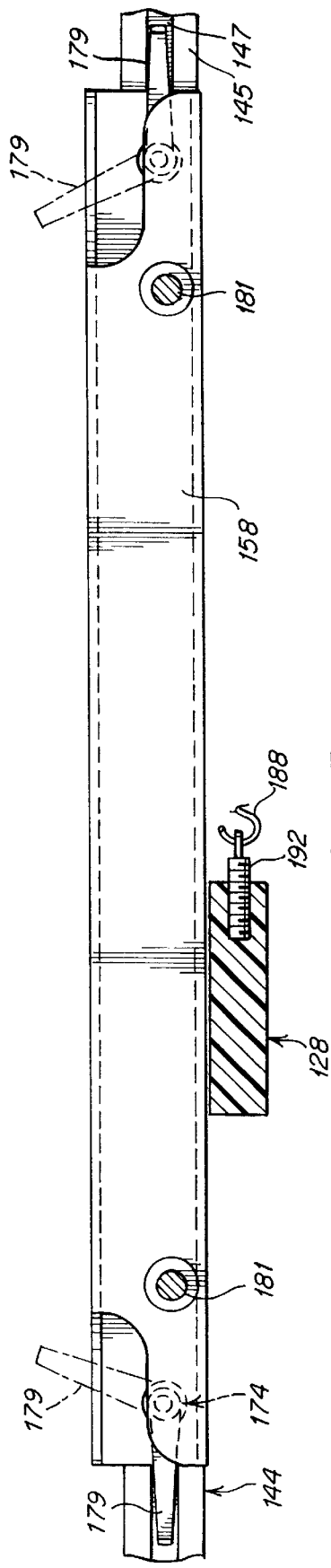

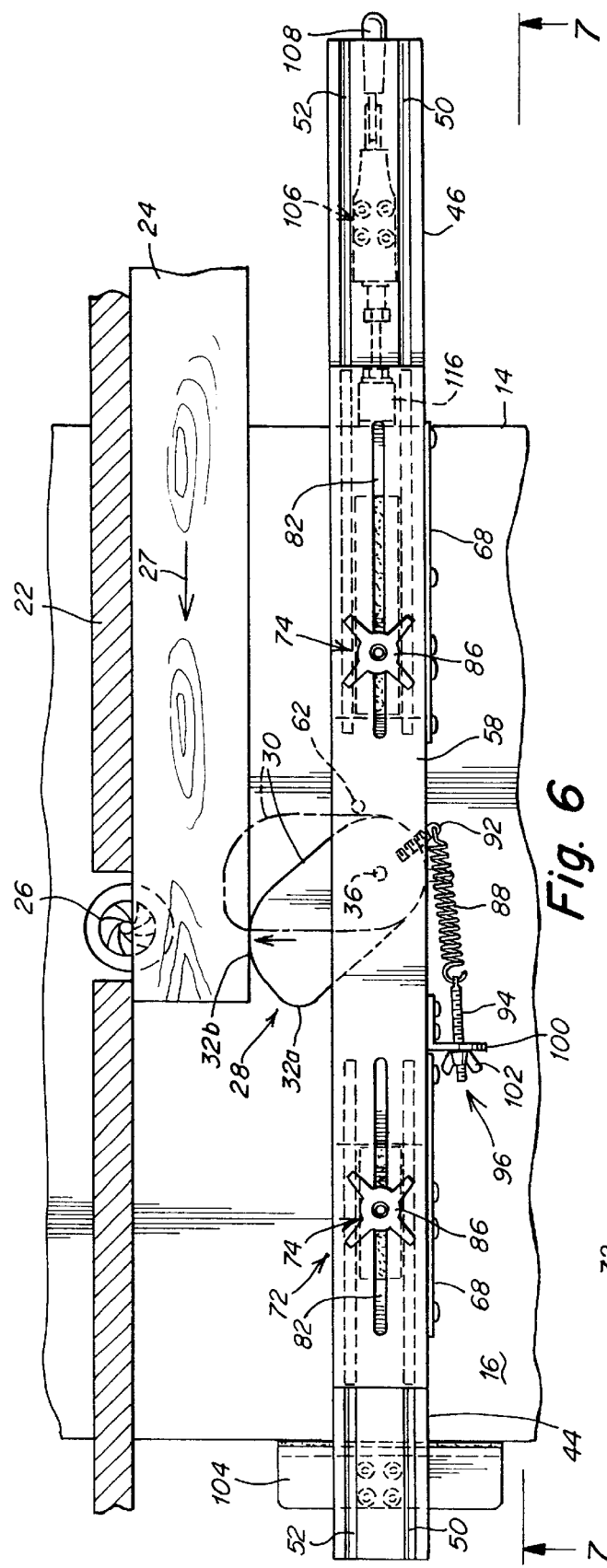
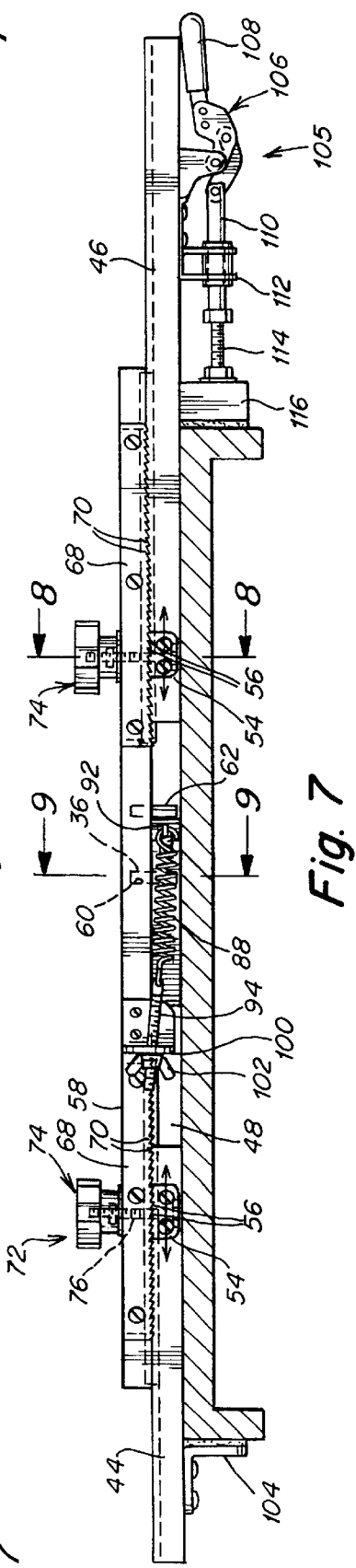
Fig. 6
Fig. 7

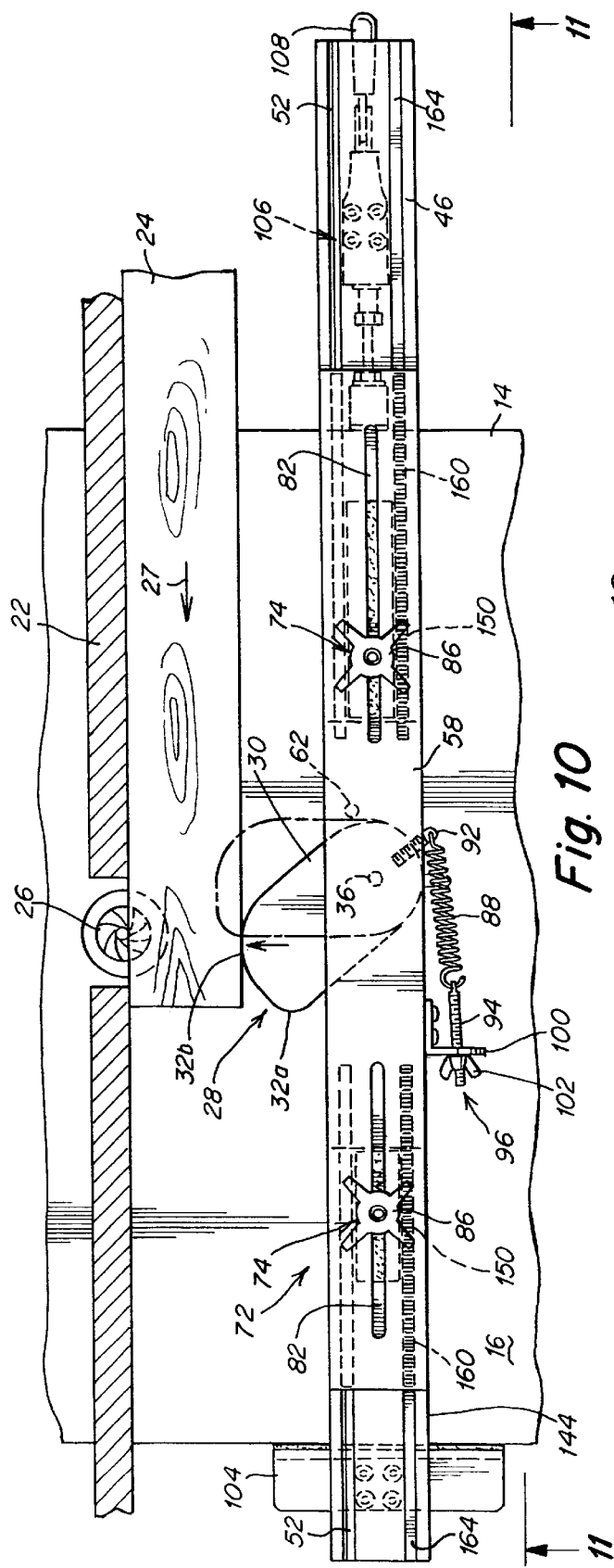
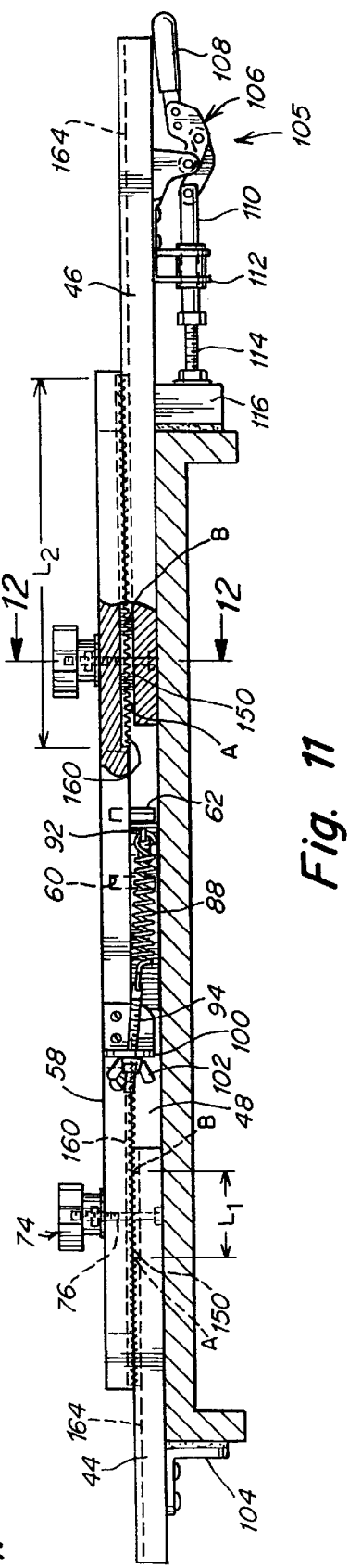
Fig. 10
Fig. 11

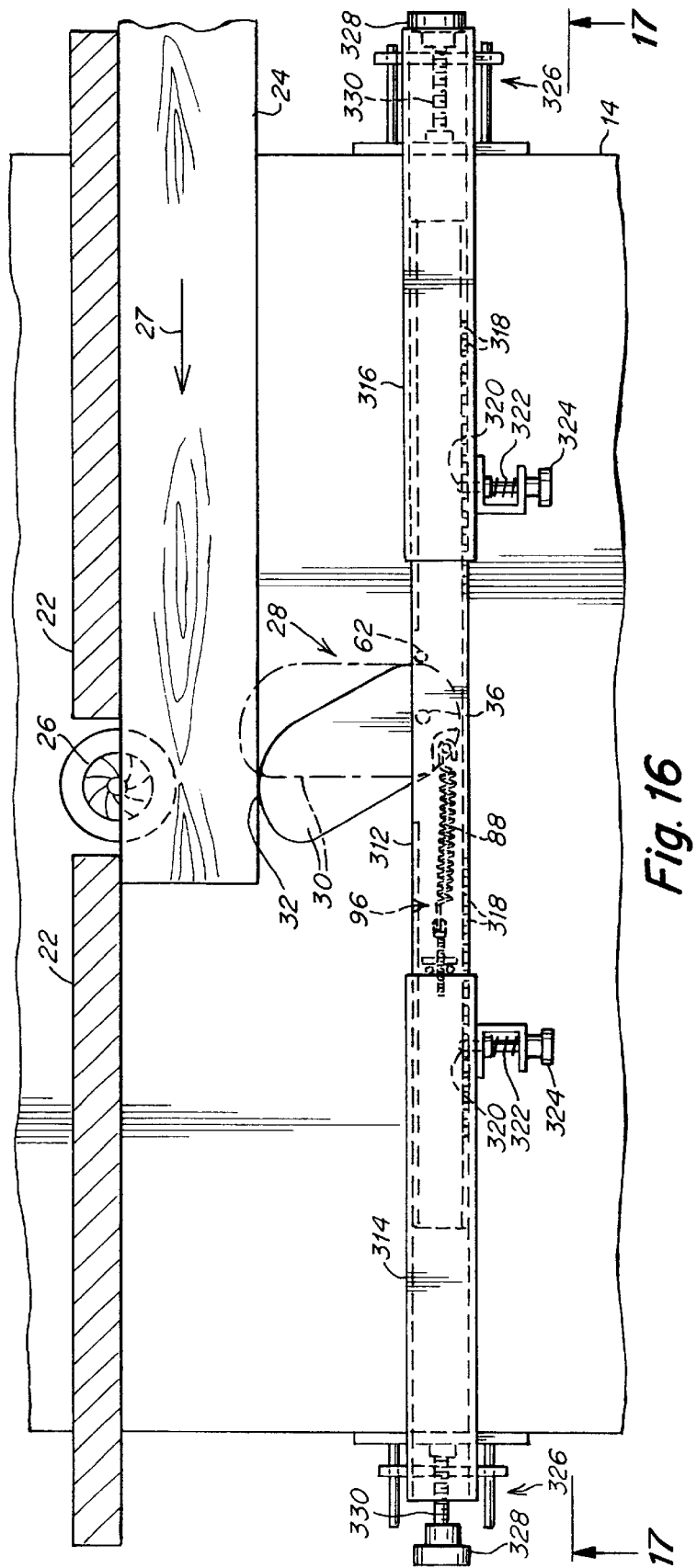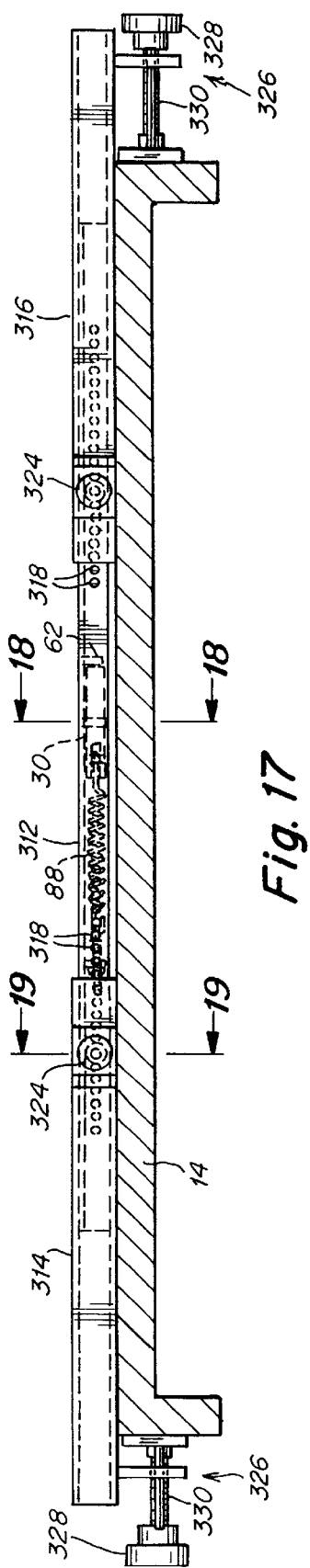
Fig. 16
Fig. 17

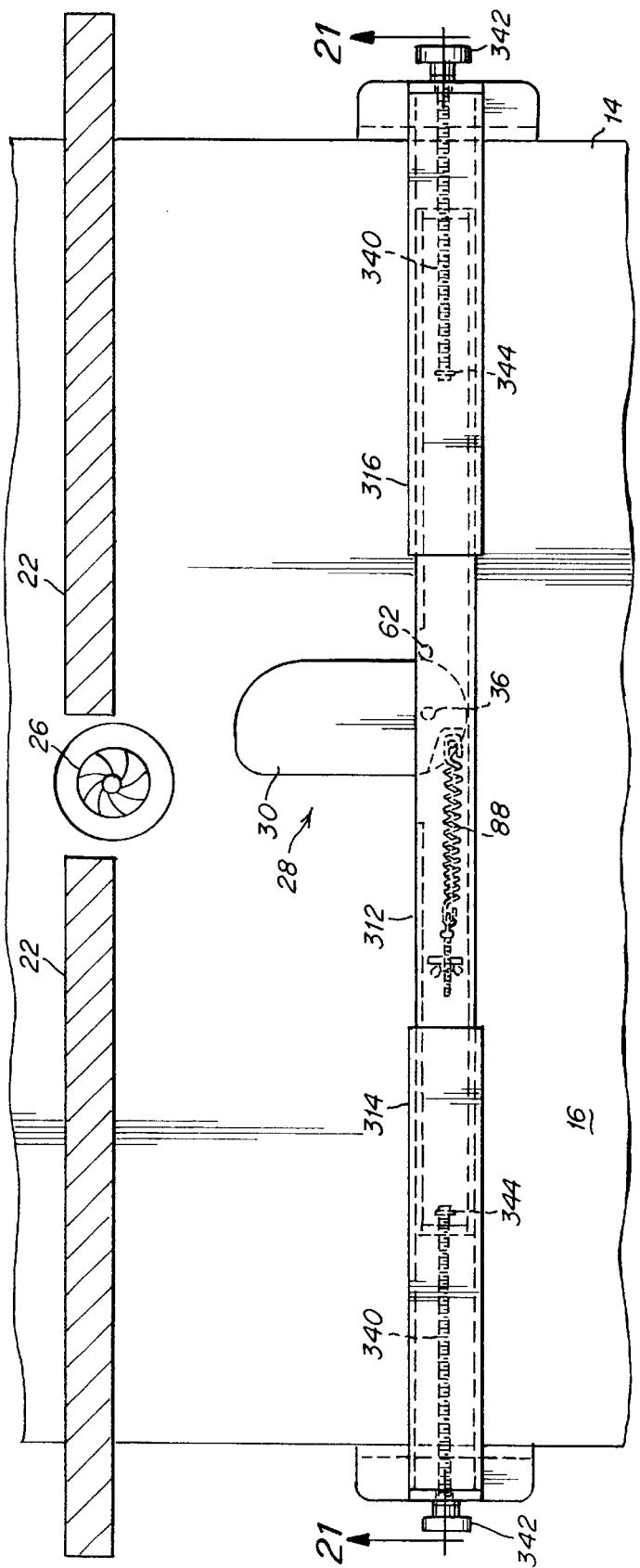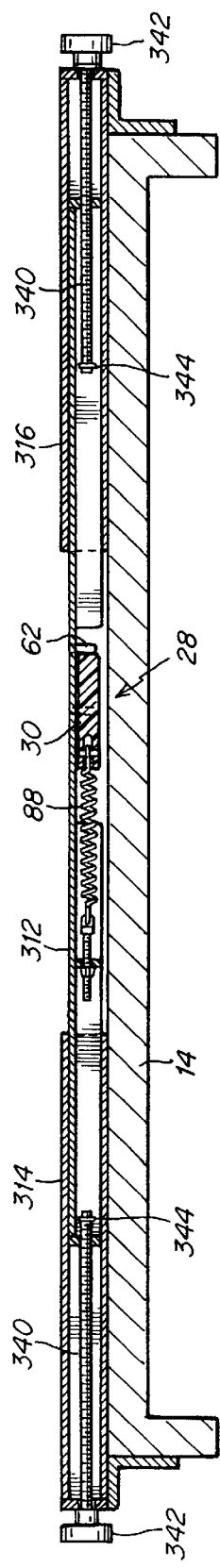
Fig. 20
Fig. 21

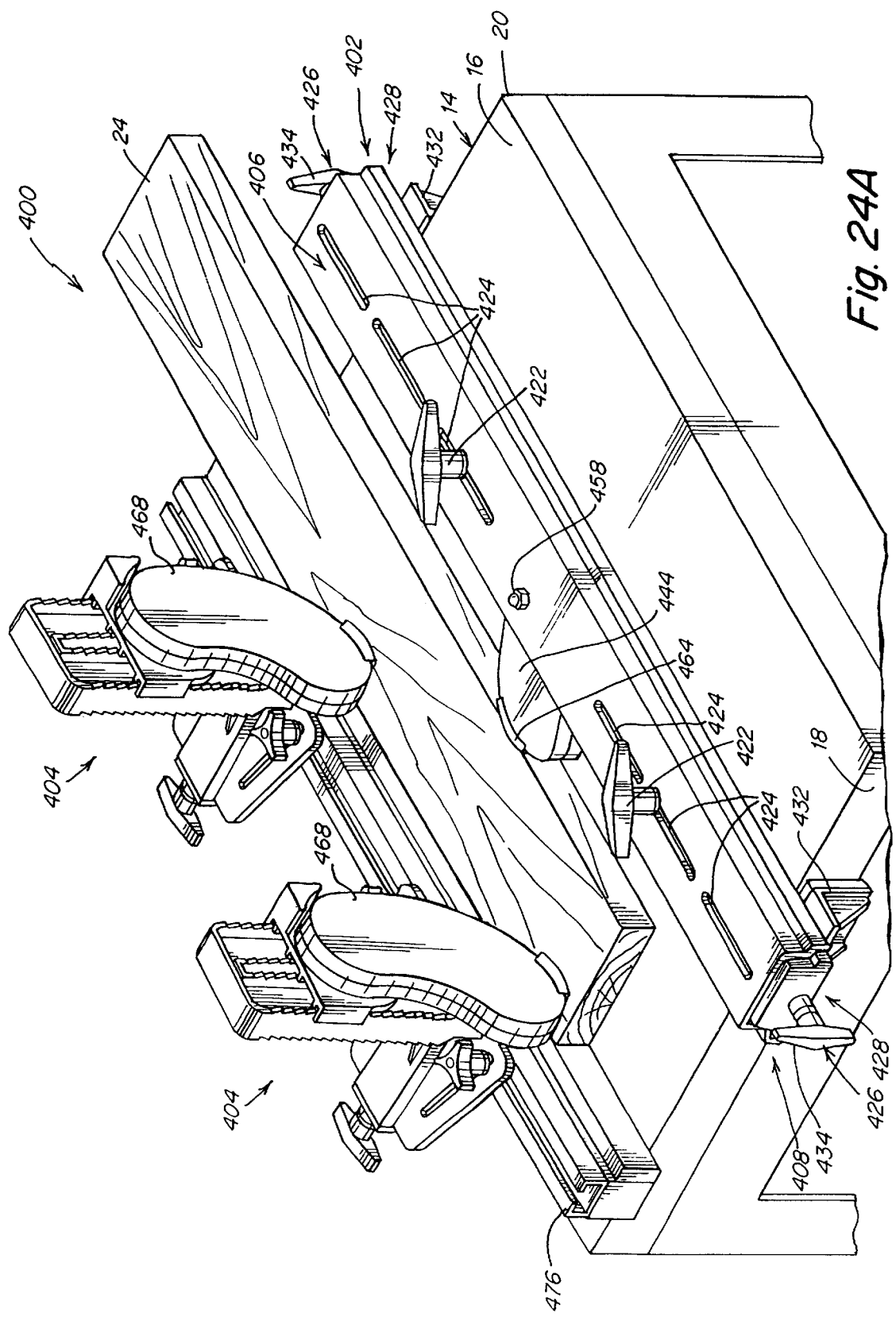

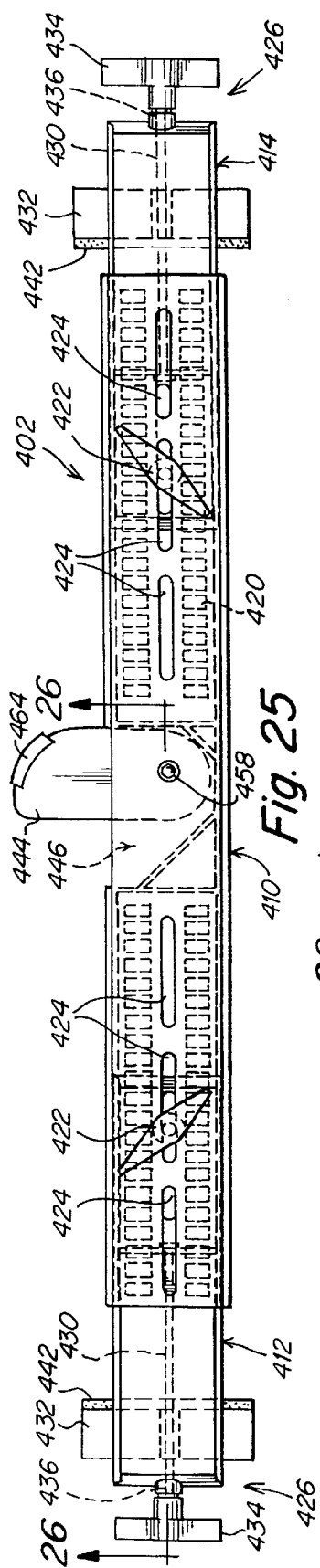
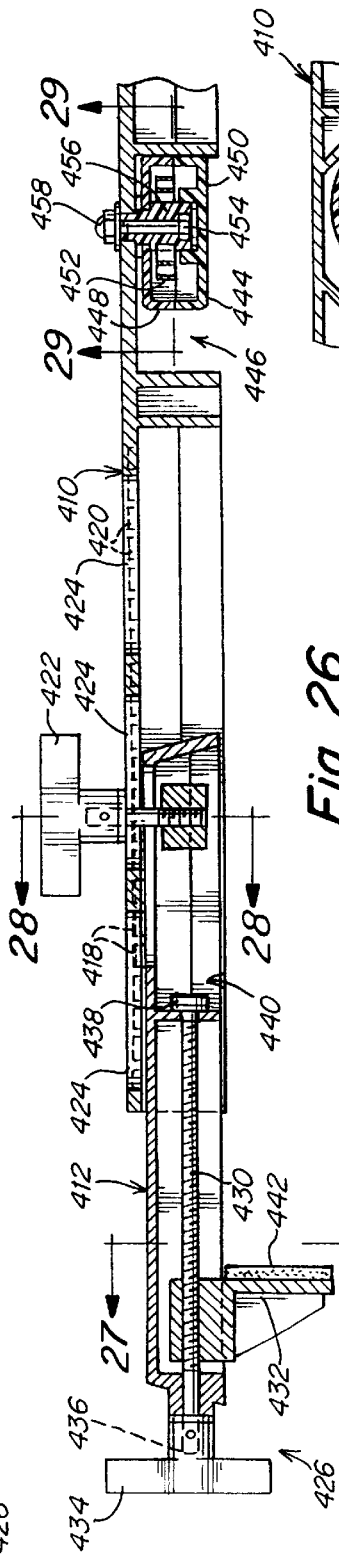
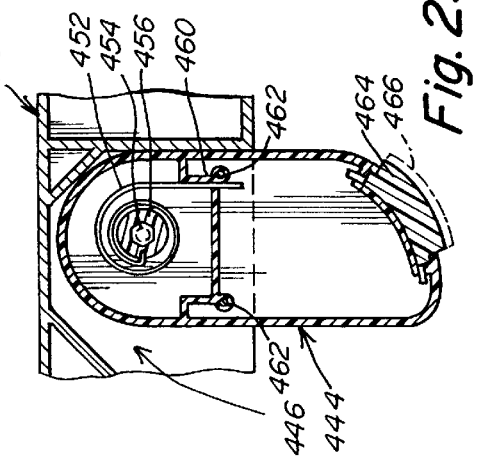
Fig. 29
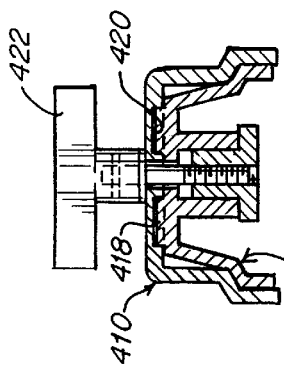
Fig. 28
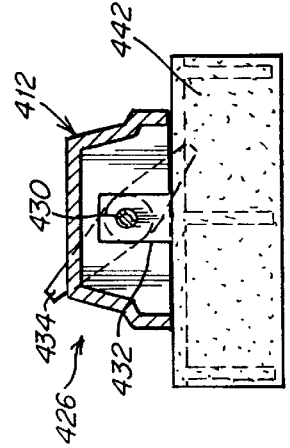
Fig. 27

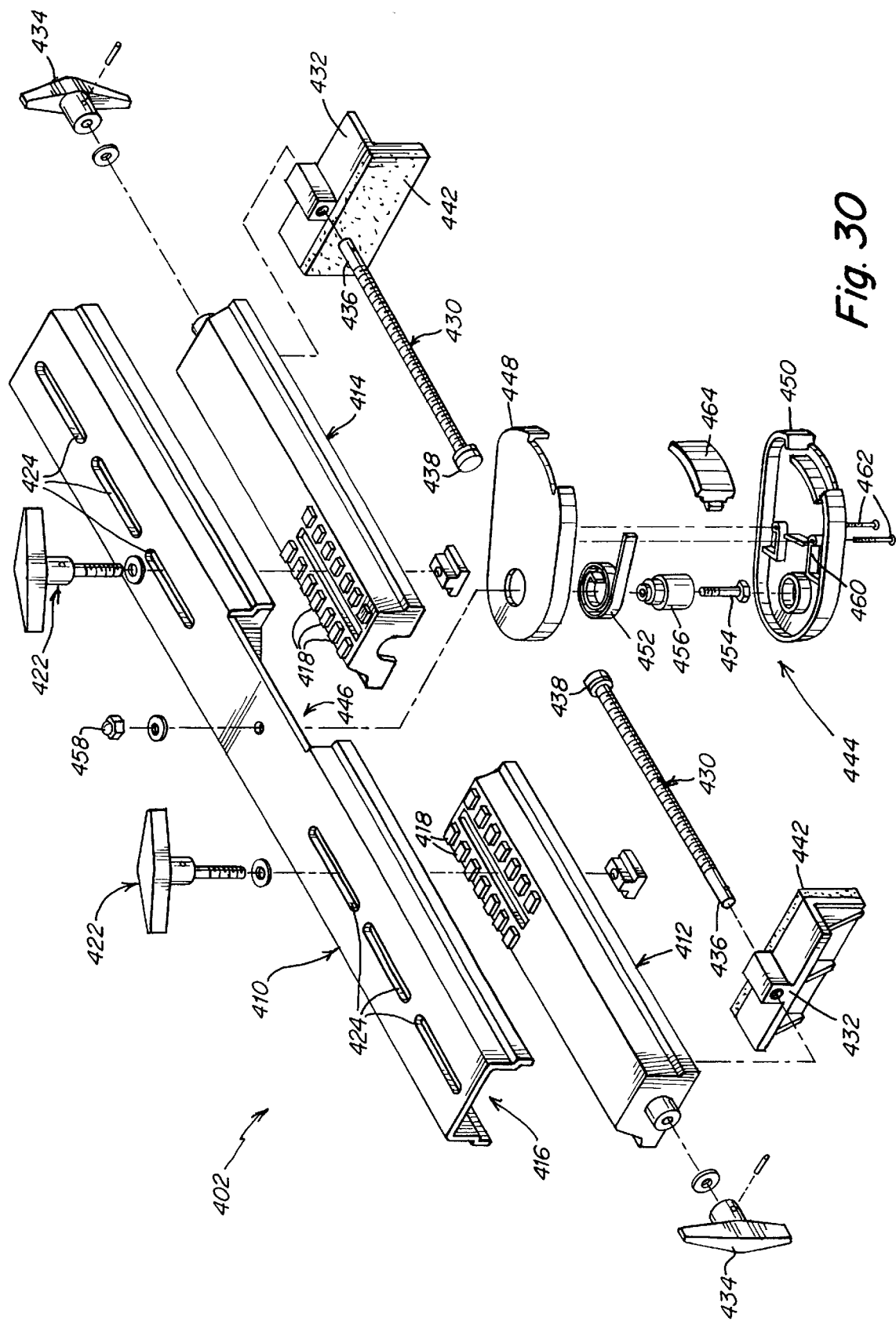

COMBINATION WORKPIECE POSITIONING/HOLD-DOWN AND ANTI-KICKBACK DEVICE FOR A WORK TABLE

CROSS-REFERENCE TO RELATED APPLICATIONS

This application claims the benefit under 35 USC 120 of application Ser. No. 09/977,119 filed Oct. 12, 2001 (now U.S. Pat. No. 6,446,687), which claims the benefit under 35 USC 120 of application Ser. No. 09/482,772, filed Jan. 13, 2000, (now U.S. Pat. No. 6,315,016 issued Nov. 13, 2001) which claims the benefit under 35 USC 119 of Provisional Application Serial No. 60/115,932 filed Jan. 14, 1999, the entire contents of each of which are incorporated herein by reference.

BACKGROUND INFORMATION

The present invention relates generally to work tables for power tools and the like, and is more particularly directed to a combination workpiece positioning/hold-down and anti-kickback device for a work table.

A work table for a woodworking device, such as a power saw, router and the like, generally includes a horizontal tabletop on which the workpiece is supported and a fence secured to the tabletop and extending in the direction of movement of the workpiece. The workpiece is moved on the upper surface of the tabletop and is guided along the fence, during a cutting or other woodworking action.

Featherboard and other devices are known for pressing the workpiece against the fence during such movement, and various hold-down devices are known for pressing the upper surface of the workpiece to hold the workpiece down on the tabletop. These devices have some of the following desirable features.

One such desirable feature is the ability to prevent kickback of the workpiece during a woodworking operation. Another desirable feature is the adjustment of the positioning or hold-down member in lengthwise, transverse and vertical directions relative to the workpiece. Still another desirable feature is the ability to variably adjust the biasing force of the positioning or hold-down member against the workpiece. The applicant is not aware, however, of any devices that include all of these features in a simple arrangement.

OBJECTS AND SUMMARY OF THE INVENTION

Accordingly, it is an object of the present invention to provide a combination workpiece positioning/hold-down and anti-kickback device that overcomes inherent disadvantages of know workpiece positioning/hold-down devices.

It is another object of the present invention to provide a combination workpiece positioning/hold-down and anti-kickback device that presses the side and/or top surface of the workpiece, while preventing kick-back thereof.

It is still another object of the present invention to provide a combination workpiece positioning/hold-down and anti-kickback device in which the positioning or hold-down member is adjustable in lengthwise, transverse and vertical directions relative to the workpiece.

It is yet another object of the present invention to provide a combination workpiece positioning/hold-down and anti-kickback device in which the biasing force of the positioning or hold-down member against the workpiece is variably adjustable.

In accordance with one form of the present invention, a combination workpiece positioning and anti-kickback device for a work table having a fence against which a workpiece is guided includes a positioning member having a main body, and an arcuate cam surface at one edge of the main body for engaging a side surface of a workpiece on the work table; an adjustment device for moving the positioning member relative to the workpiece, the adjustment device including: a lengthwise adjustment assembly movable in a lengthwise direction of movement of the workpiece along the work table for adjusting the position of the positioning member in said lengthwise direction, and a transverse adjustment assembly movable in a direction transverse relative to said lengthwise direction for adjusting the position of the positioning member in the transverse direction, the transverse adjustment assembly being connected to the lengthwise adjustment assembly; a lengthwise releasable locking device for releasably locking the lengthwise adjustment assembly relative to the work table at a desired location in the lengthwise direction; a transverse releasable locking device for releasably locking the transverse adjustment assembly relative to the work table at a desired location in the transverse direction; a pivot which pivotally mounts the positioning member to the adjustment device for pivoting movement; and a spring for biasing the positioning member with a biasing force in a first pivot direction about said pivot such that said arcuate cam surface is biased in a direction opposite to a feed direction of said workpiece and into engagement with the side surface of the workpiece; wherein said lengthwise adjustment assembly includes at least first and second lengthwise adjustment members, the first lengthwise adjustment member being received within an interior portion of the second lengthwise adjustment member.

In accordance with another form of the present invention, a combination workpiece hold-down and anti-kickback device for a work table having a fence against which a workpiece is guided includes a hold-down member having a main body, and an arcuate cam surface at one edge of the main body for engaging an upper surface of a workpiece on the work table; an adjustment device for moving the hold-down member relative to the workpiece, the adjustment device including a lengthwise adjustment assembly movable in a lengthwise direction of movement of the workpiece along the work table for adjusting the position of the hold-down member in said lengthwise direction, a transverse adjustment assembly movable in a direction transverse to said lengthwise direction for adjusting the position of the hold-down member in the transverse direction, the transverse adjustment assembly being connected to the lengthwise adjustment assembly; a vertical adjustment assembly movable in a vertical direction transverse to said lengthwise and transverse directions for adjusting the position of the hold-down member in the vertical direction, the vertical adjustment assembly being movably connected to the transverse lengthwise adjustment assemblies; a lengthwise releasable locking device for releasably locking the lengthwise adjustment assembly relative to the work table at a desired location in the lengthwise direction; a transverse releasable locking device for releasably locking the transverse adjustment assembly relative to the worktable at a desired location in the transverse direction; a vertical releasable locking device for releasably locking the vertical adjustment assembly relative to the work table at a desired location in the vertical direction; a pivot which pivotally mounts the hold-down member to the adjustment device for pivoting movement; and a spring for biasing the hold-down member with a biasing force in a first pivot direction about said pivot such that said arcuate cam surface is biased in a direction opposite to a feed direction of said workpiece and into engagement with the upper surface of the workpiece.

In accordance with another form of the present invention, a combination workpiece positioning, hold-down and anti-kickback device for a work table having a fence against which a workpiece is guided, comprising a positioning member having a main body, and an arcuate cam surface at one edge of the main body for engaging a side surface of a workpiece on the work table; an adjustment device for moving the positioning member relative to the workpiece, the adjustment device including a lengthwise adjustment assembly movable in a lengthwise direction of movement of the workpiece along the work table for adjusting the position of the positioning member in said lengthwise direction, and a transverse adjustment assembly movable in a direction transverse relative to said lengthwise direction for adjusting the position of the positioning member in the transverse direction, the transverse adjustment assembly being movably connected to the lengthwise adjustment assembly; a lengthwise releasable locking device for releasably locking the lengthwise adjustment assembly relative to the work table at a desired location in the lengthwise direction; a transverse releasable locking device for releasably locking the transverse adjustment assembly relative to the work table at a desired location in the transverse direction; a pivot which pivotally mounts the positioning member to the adjustment device for pivoting movement; a spring for biasing the positioning member with a biasing force in a first pivot direction about said pivot such that said arcuate cam surface is biased in a direction opposite to a feed direction of said workpiece and into engagement with the side surface of the workpiece; a hold-down member having a main body, and an arcuate cam surface at one edge of the main body for engaging an upper surface of the workpiece on the table; an adjustment device for moving the hold-down member relative to the workpiece, the adjustment device including a lengthwise adjustment assembly movable in a lengthwise direction of movement of the workpiece along the work table for adjusting the position of the hold-down member in said lengthwise direction, a transverse adjustment assembly movable in a direction transverse to said lengthwise direction for adjusting the position of the hold-down member in the transverse direction, the transverse adjustment assembly being movably connected to the lengthwise adjustment assembly; and a vertical adjustment assembly movable in a vertical direction transverse to said lengthwise and transverse directions for adjusting the position of the hold-down member in the vertical direction, the vertical adjustment assembly being movably connected to the transverse lengthwise adjustment assemblies; a lengthwise releasable locking device for releasably locking the lengthwise adjustment assembly relative to the work table at a desired location in the lengthwise direction; a transverse releasable locking device for releasably locking the transverse adjustment assembly relative to the worktable at a desired location in the transverse direction; a vertical releasable locking device for releasably locking the vertical adjustment assembly relative to the work table at a desired location in the vertical direction; a pivot which pivotally mounts the hold-down member to the adjustment device for pivoting movement; and a spring for biasing the hold-down member with a biasing force in a first pivot direction about said pivot such that said arcuate cam surface is biased in a direction opposite to a feed direction of said workpiece and into engagement with the upper surface of the workpiece, wherein said lengthwise adjustment assembly includes at least first and second lengthwise adjustment members, the first lengthwise adjustment member being received within an interior portion of the second lengthwise adjustment member; and wherein a hold-down member having a main body, and an arcuate cam surface at one edge of the main body for engaging an upper surface of a workpiece on the work table.

The above and other objects, features and advantages of the present invention will become readily apparent from the following detailed description of the illustrative embodiments thereof, which is to be read in connection with the accompanying drawings.

BRIEF DESCRIPTION OF THE DRAWINGS

FIG. 4 is a cross-sectional view of the combination workpiece positioning/hold-down and anti-kickback device, taken along line 4—4 of FIG. 2;

FIG. 5 is a cross-sectional view of the combination workpiece positioning/hold-down and anti-kickback device, taken along line 5—5 of FIG. 2;

FIG. 6 is a top plan view, partly in section, of the combination workpiece positioning/hold-down and anti-kickback device, as viewed along line 6—6 of FIG. 1;

FIG. 7 is an end elevational view, partly in section, of the combination workpiece positioning/hold-down and anti-kickback device, as viewed along line 7—7 of FIG. 6;

FIG. 10 is a top plan view, partly in section, of a modified embodiment wherein locking teeth 56, 70 are replaced with mutually engaging linear gear racks;

FIG. 11 is an end elevational view, partly in section, of the modified embodiment of FIG. 10;

FIG. 16 is a cross-sectional view of the combination workpiece positioning/hold-down and anti-kickback device, taken along line 16—16 of FIG. 13;

FIG. 17 is a cross-sectional view of the combination workpiece positioning/hold-down and anti-kickback device, taken along line 17—17 of FIG. 16;

FIG. 20 is a top plan view, partly in section, of a modified embodiment of the present invention;

FIG. 21 is cross-sectional view of the modified embodiment of FIG. 20 taken along line 21—21 of FIG. 20;

FIG. 24A is a perspective view of the combination workpiece positioning/hold-down and anti-kickback device of FIG. 24 having two hold-down units for added anti-kickback and hold-down protection;

FIG. 25 is a top plan view of the combination workpiece positioning/hold-down and anti-kickback device taken along line 25—25 of FIG. 24;

FIG. 26 is a fragmentary cross-sectional front view of the combination workpiece positioning/hold-down and anti-kickback device taken along line 26—26 of FIG. 25;

FIG. 27 is a cross-sectional view of the combination workpiece positioning/hold-down and anti-kickback taken along line 27—27 of FIG. 26;

FIG. 28 is a side cross-sectional view of the combination workpiece positioning/hold-down and anti-kickback taken along lines 28—28 of FIG. 26;

FIG. 29 is a cross-sectional bottom view of the combination workpiece positioning/hold-down and anti-kickback taken along line 29—29 of FIG. 26;

FIG. 30 is an exploded perspective view of the horizontal positioning device shown in FIG. 25;

DETAILED DESCRIPTION OF THE PREFERRED EMBODIMENTS

Figure 1:
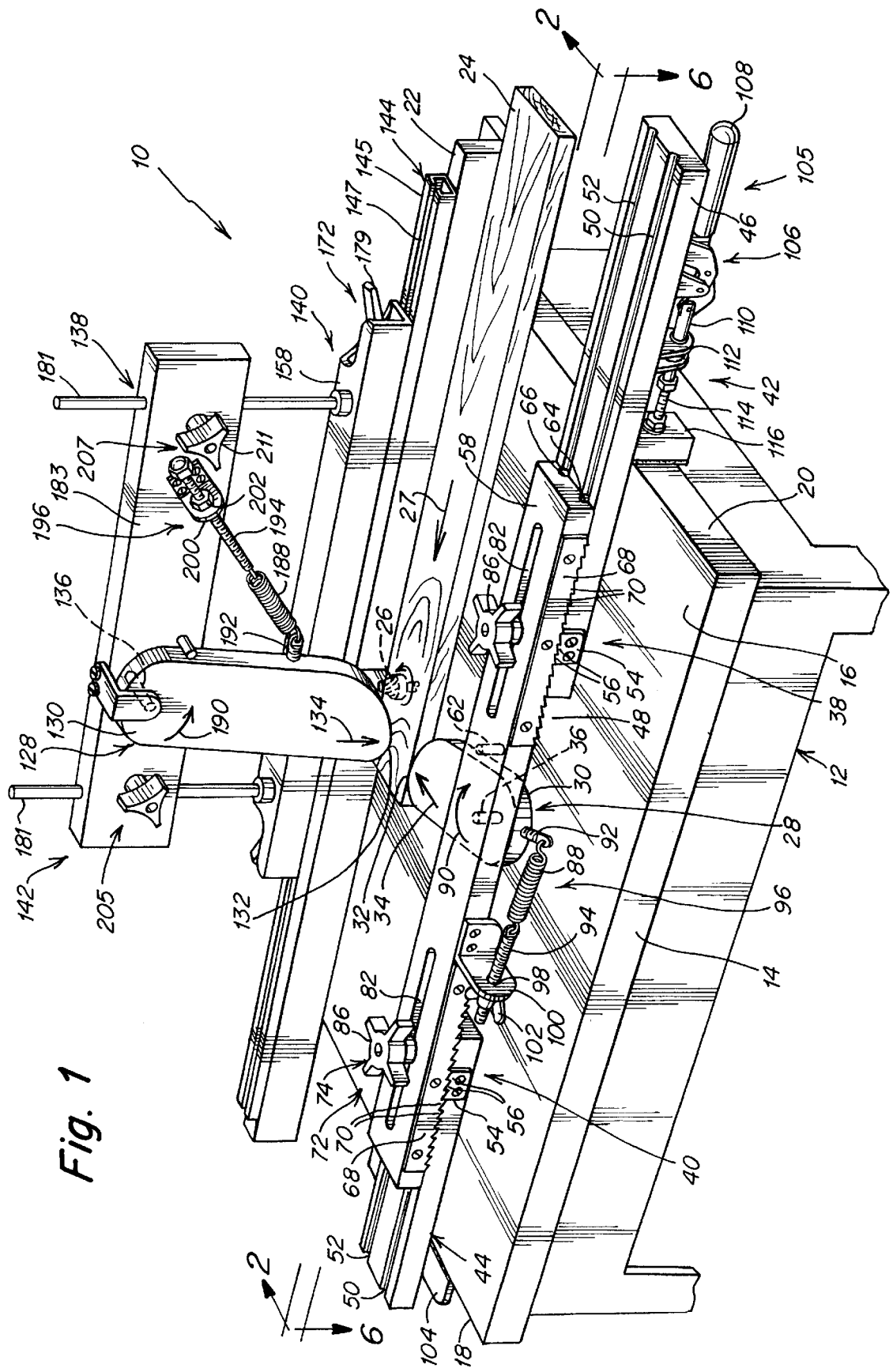
FIG. 1 is a perspective view of the combination workpiece positioning/hold-down and anti-kickback device according to the present invention.

Referring to the drawings in detail, a combination workpiece positioning/hold-down and anti-kickback device 10 according to the present invention is designed for a use with a work table 12 having a tabletop 14 with an upper surface 16 and opposite transverse sides 18 and 20. As is conventional, a fence 22 is secured at one edge of work table 12. During operation, a workpiece 24, such as a piece of wood, is positioned on upper surface 16 and against fence 22. Then, a woodworking operation is performed by a woodworking tool such as a saw, router 26 and the like, while workpiece 24 is moved in the lengthwise direction 27 of work table 12, against fence 22.

In order to press workpiece 24 against fence 22, combination workpiece positioning/hold-down and anti-kickback device 10 includes a positioning member 28 having a main body 30 with a generally oblong shape, and an arcuate cam surface 32 at one shorter edge of main body 30 for engaging a side surface of workpiece 24 on work table 12. Positioning member 28 can be made of a plastic material, a Teflon (trademark) like material, or the like. In accordance with the present invention, as will be described in more detail below, main body 30 is oriented substantially in a direction 34 transverse to lengthwise direction 27. Further, arcuate cam surface 32 has a curvature with an increasing radius in a direction opposite to the direction 27 of movement of workpiece 24 along work table 12 such that smaller radius portions 32a of arcuate cam surface 32 extend closer toward workpiece 24 than larger radius portions 32b of arcuate cam surface 32. This means that, as positioning member 28 is pivoted about a fixed pivot pin, as will be described hereinafter, engagement with smaller radius portions 32a provides a stronger biasing action.

A pivot pin 36 which is fixed to main body 30 at a side opposite from arcuate cam surface 32, is pivotally mounted to an adjustment device 38 for moving positioning member 28 relative to workpiece 24. Specifically, adjustment device 38 includes a lengthwise adjustment assembly 40 movable in lengthwise direction 27 for adjusting the position of positioning member 28 in lengthwise direction 27, and a transverse adjustment assembly 42 movable in transverse direction 34 for adjusting the position of positioning member 28 in transverse direction 34, with transverse adjustment assembly 42 being movably connected to lengthwise adjustment assembly 40.

Lengthwise adjustment assembly 40 includes a first guide track 44 extending in lengthwise direction 27 and a second guide track 46 extending in lengthwise direction 27, second guide track 46 being collinear with first guide track 44, with a gap 48 between first and second guide tracks 44 and 46. Positioning member 28 is located in gap 48. Each guide track 44 and 46 includes two spaced apart and parallel grooves 50 and 52 therein, the purpose for which will become apparent from the discussion hereinafter. Further, side plates 54 are secured to sides of guide tracks 44 and 46 at adjacent ends of guide tracks 44 and 46, with upper edges of side plates 54 having short locking teeth 56 thereon.

Lengthwise adjustment assembly 40 further includes a guide rail 58 mounted on top of guide tracks 44 and 46 and interconnecting guide tracks 44 and 46. In this regard, guide rail 58 lies above gap 48, with pivot pin 36 being pivotally mounted in a recess 60 at the underside of guide rail 58. In addition, guide rail 58 includes a downwardly extending stop pin 62 which limits the angular pivoting range of positioning member 28.

Guide rail 58 includes two spaced apart and parallel, lengthwise extending rods 64 and 66 secured to an underside thereof by countersunk screws 67 (FIG. 8), and which slidably extend within grooves 50 and 52, respectively, to prevent transverse movement of guide rail 58 relative to guide tracks 44 and 46.

Further, guide rail 58 includes side plates 68 at opposite ends thereof, each having locking teeth 70 at the lower edge thereof which engage with locking teeth 56 of side plates 54 of first and second guide tracks 44 and 46, to prevent relative lengthwise movement therebetween when guide rail 58 is clamped to guide tracks 44 and 46, as will be described hereinafter.

In order to provide such clamping operation, a lengthwise releasable locking device 72 is provided, which effectively releasably locks lengthwise adjustment assembly 40 relative to work table 12 at a desired location in lengthwise direction 27. Specifically, lengthwise releasable locking device 72 includes two releasable clamping devices 74 for releasably clamping guide rail 58 to first and second guide tracks 44 and 46 at a desired location therealong.

Figure 8:
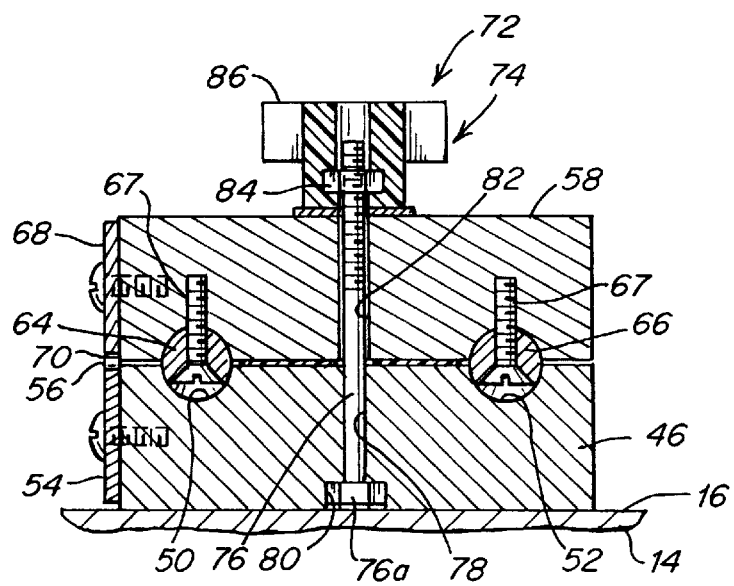
FIG. 8 is a cross-sectional view of the combination workpiece positioning/hold-down and anti-kickback device, taken along line 8—8 of FIG. 7.
Figure 9:
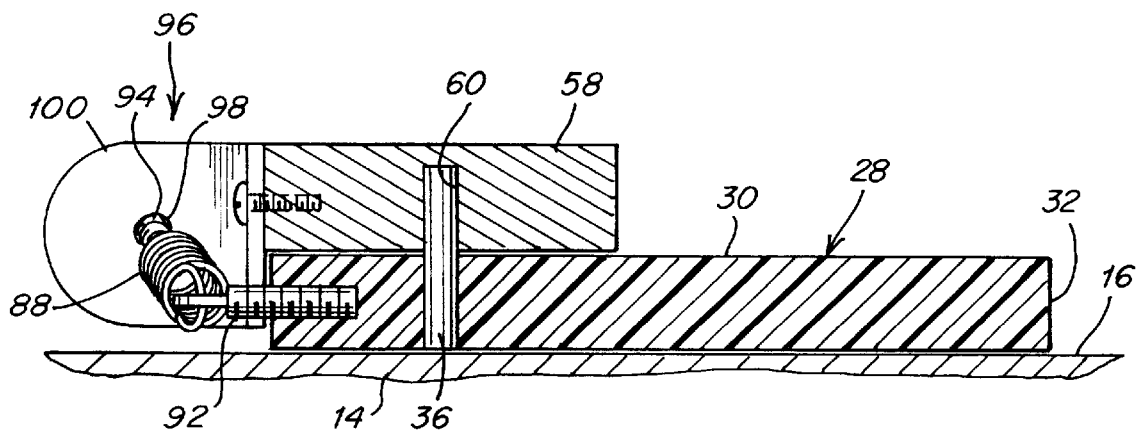
FIG. 9 is a cross-sectional view of the combination workpiece positioning/hold-down and anti-kickback device, taken along line 9—9 of FIG. 7.

As best shown in FIG. 8, each releasable clamping device 74 includes a bolt 76 extending through a vertically oriented hole 78 in each guide track 44 and 46. The lower end of hole 78 can have a hexagonal recess 80 therein for receiving the hexagonal bolt head 76a. Guide rail 58 includes two aligned through slots 82 at opposite ends thereof, each through slot 82 extending in lengthwise direction 27. Each bolt 76 thereby extends through hole 78 and a respective through slot 82, and then to a position above guide rail 58, where it threadedly receives a nut 84 thereon. A clamping head 86 is secured to nut 84.

Thus, as clamping head 86 is rotated, nut 84 is caused to rotate, whereby clamping head 86 moves down in order to press guide rail 58 onto guide tracks 44 and 46, and thereby releasably lock guide rail 58 to guide tracks 44 and 46. In such condition, guide rail 58 and guide tracks 44 and 46 form a unitary assembly.

With this arrangement, assuming that guide tracks 44 and 46 are fixed in position, as will be discussed hereinafter, guide rail 58 can move in lengthwise direction 27. Since positioning member 28 is pivotally mounted to guide rail 58, positioning member 28 is also moved in lengthwise direction 27 for adjusting the position thereof.

A coil spring 88 is connected between positioning member 28 and adjustment device 38 for biasing positioning member 28 with a biasing force in a first pivot direction 90 about pivot pin 36 such that arcuate cam surface 32 is biased in a direction opposite to feed direction 27 of workpiece 24 and into engagement with the side surface of workpiece 24.

In this regard, an eyelet 92 is secured to the side edge of positioning member 28 which is opposite arcuate cam surface 32, with one end of spring 88 secured to eyelet 92. The opposite end of spring 88 is secured to a threaded rod 94 which forms part of a variable tensioning device 96 for variably adjusting the biasing force of spring 88. Rod 94 extends through an opening 98 in an L-shaped bracket 100 which is secured to the side edge of guide rail 58, and a wing nut 102 is threaded to the end of rod 94 extending out through opening 98. As a result, positioning member 28 is pivoted in pivot direction 90 about pivot pin 36 with a biasing force which is variably adjustable by tightening or loosening wing nut 102.

In order to move positioning member 28 in transverse direction 34, that is, closer to or farther away from workpiece 24, adjustment device 38 includes transverse adjustment assembly 42 which is movable in transverse direction 34. Transverse adjustment assembly 42 includes a first abutment 104 in the form of an L-shaped bracket fixed to the lower surface of first guide track 44 for engaging one transverse side 18 of work table 12 and a second abutment 116 for engaging the opposite transverse side 20 of work table 12.

In order to lock first and second abutments 104 and 116 against work table 12, and thereby releasably lock positioning member 28 in a desired transverse position, a transverse release locking device 105 includes an overcenter clamp 106 fixed to the lower surface of second guide track 46, with overcenter clamp 106 having a handle 108 pivotally secured to a linkage 110 that is slidably mounted to the lower surface of second guide track 46 by a holder 112. A threaded rod 114 is threadedly secured to the end of linkage 110, and second abutment 116 is secured to the opposite end of threaded rod 114.

With this arrangement, threaded rod 114 is turned so as to move second abutment 116 closer to or farther away from handle 108 in lengthwise direction 27. This is performed until abutments 104 and 116 loosely abut against transverse sides 18 and 20 of work table 12. Then, handle 108 is pivoted to a closed position, thereby moving threaded rod 114 away from it, whereby first and second abutments 104 and 116 tightly engage tabletop 14. In this manner, positioning member 28 can be moved toward or away from workpiece 24, and be secured in a desired transverse position.

In operation, the position of positioning member 28 in lengthwise direction 27 is first adjusted by lengthwise adjustment assembly 40. Thereafter, the position of positioning member 28 in transverse direction 34 is adjusted by transverse adjustment assembly 42. Wing nut 102 is then rotated to adjust the spring biasing force.

When workpiece 24 is moved in feed direction 27, for example, for a router operation, spring 88 rotates arcuate cam surface 32 of positioning member 28 into engagement with the side of workpiece 24 with a light spring tension. Thus, workpiece 24 is pushed against fence 22 to obtain exact positioning of workpiece 24. It is to be pointed out that the material of positioning member 28 and the spring force on positioning member 28 do not damage workpiece 24, even if workpiece 24 is made from a soft wood material, such as pine.

As workpiece 24 is moved in the feed direction 27, there may be a tendency for router 26 to impart a force to workpiece 24 which tends to push it in a direction away from fence 22, that is, to provide a kick-back. With the present invention, however, this results in positioning member 28 being rotated further in pivot direction 90. As a result, because of the curvature of arcuate cam surface 32, there is a stronger force applied to workpiece 24, which acts against such kick-back in order to prevent or minimize the same. This occurs even through positioning member 28 is made of a plastic material, a Teflon (trademark) like material, or the like, and may be somewhat slippery.

In order to press workpiece 24 down from above, combination workpiece positioning/hold-down and anti-kickback device 10 includes a hold-down member 128 having a main body 130 with a generally oblong shape, and an arcuate cam surface 132 at one shorter edge of main body 130 for engaging an upper surface of workpiece 24 on work table 12. Hold-down member 128 can be made of a plastic material, a Teflon (trademark) like material, or the like. In accordance with the present invention, as will be described in more detail below, main body 130 is oriented substantially in a vertical direction 134 transverse to lengthwise direction 27. Further, arcuate cam surface 132 has a curvature with an increasing radius in a direction opposite to the direction 27 of movement of workpiece 24 along work table 12 such that smaller radius portions 132a of arcuate cam surface 132 extend closer toward workpiece 24 than larger radius portions 132b of arcuate cam surface 132.

A pivot pin 136 which is fixed to main body 130 at a side opposite from arcuate cam surface 132, is pivotally mounted to an adjustment device 138 for moving hold-down member 128 relative to workpiece 24. Specifically, adjustment device 138 includes a lengthwise adjustment assembly 140 movable in lengthwise direction 27 for adjusting the position of hold-down member 128 in lengthwise direction 27, and a vertical adjustment assembly 142 movable in vertical direction 134 for adjusting the position of hold-down member 128 in vertical direction 134, with vertical adjustment assembly 142 being movably connected to lengthwise adjustment assembly 140.

Lengthwise adjustment assembly 140 includes a guide track 144 extending in lengthwise direction 27. Guide track 144 is formed by a generally tubular member 145 of a square cross-section and having a slot 147 running the length at the upper surface thereof. Lengthwise adjustment assembly 140 further includes a guide rail 158 slidably mounted on top of guide track 144.

In order to provide such sliding movement and to also provide a clamping operation, a lengthwise releasable locking device 172 is provided, which effectively releasably locks lengthwise adjustment assembly 140 relative to work table 12 at a desired location in lengthwise direction 27. Specifically, lengthwise releasable locking device 172 includes a releasable clamping device 174 for releasably clamping guide rail 158 to guide track 144 at a desired location therealong.

Figure 2:
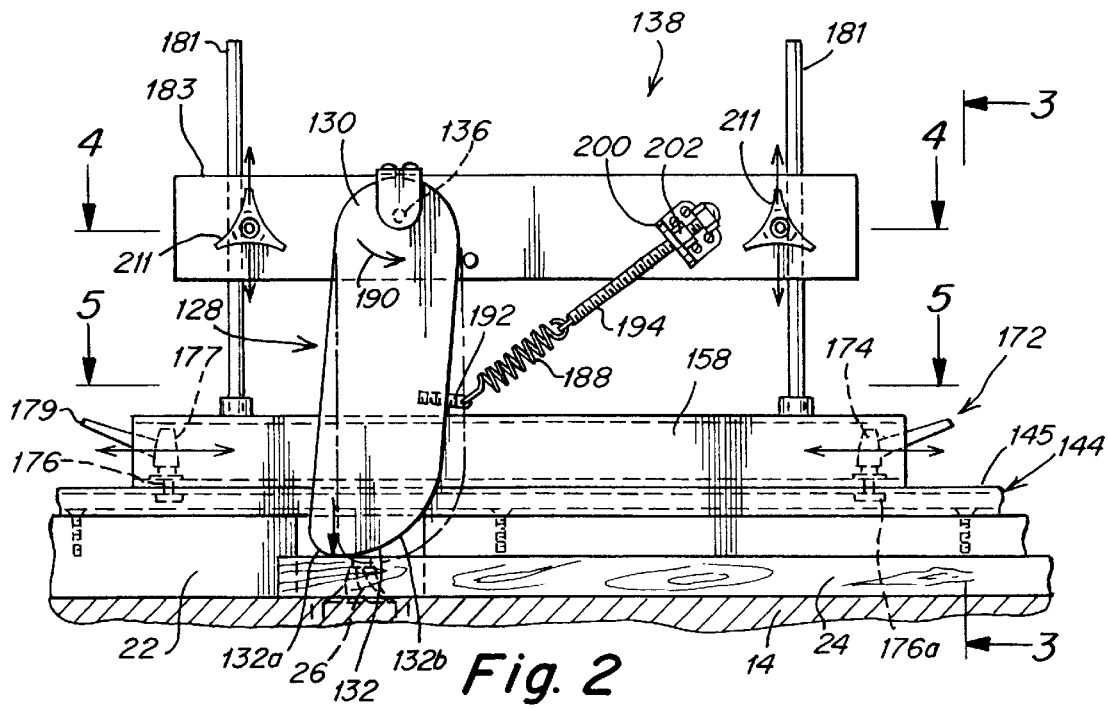
FIG. 2 is a front elevational view, partly in section, of the combination workpiece positioning/hold-down and anti-kickback device, as viewed along line 2—2 of FIG. 1.
Figure 3:
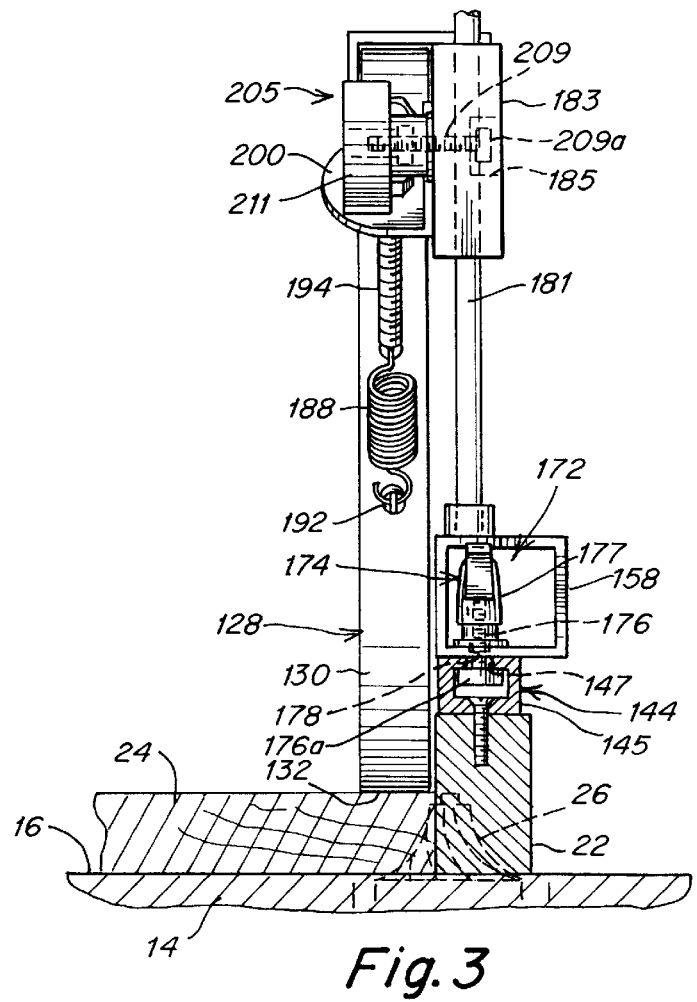
FIG. 3 is an end elevational view, partly in section, of the combination workpiece positioning/hold-down and anti-kickback device, as viewed along line 3—3 of FIG. 2.

As best shown in FIG. 3, releasable clamping device 174 includes a bolt 176 extending through slot 147 and a hole 178 in guide rail 158, with bolt head 176a being received in guide rail 144. The opposite end of bolt 176 extends into guide rail 158 where it is engaged with a clamp 177 having a rotatable handle 179 (shown in FIGS. 1, 2 and 5). When handle 179 is rotated in one direction, bolt 176 is pulled up, so that bolt head 176a engages with guide track 144 so as to releasably lock guide rail 158 to guide track 144. When handle 179 is rotated in the opposite direction, bolt 176 is lowered, thereby permitting sliding movement of guide rail 158 on guide track 144 to adjust the lengthwise position thereof.

In order to move hold-down member 128 in vertical direction 134, that is, closer to or farther away from workpiece 24, adjustment device 138 includes vertical adjustment assembly 142 which is movable in vertical direction 134. Vertical adjustment assembly 142 includes two vertically oriented rods 181 extending upwardly from guide rail 158 in parallel, spaced apart relation. A guide block 183 is slidably mounted along vertically oriented rods 181.

As best shown in FIG. 4, guide block 183 has two T-shaped slots 185 extending in vertical direction 134. A vertical releasable locking device 205 includes a releasable clamp 207 secured to guide block 183 for releasably engaging vertically oriented rods 181. Specifically, a bolt 209 extends through each T-shaped slot 185 such that the respective rod 181 is captured in the T-shaped slot 185 between the bolt head 209a and guide block 183. A clamp head 211 threadedly receives the free end of bolt 209 extending through T-shaped slot 185. When clamp head 211 is tightened, bolt head 209a clamps the respective rod 181 against guide block 183 to releasably lock guide block 183 in a desired vertical position. When clamp head 211 is loosened, bolt head 209a no longer clamps the rod 181, so that guide block 183 is free to move along rods 181.

A coil spring 188 is connected between hold-down member 128 and adjustment device 138 for biasing hold-down member 128 with a biasing force in a first pivot direction 190 about pivot pin 136 such that arcuate cam surface 132 is biased in a direction opposite to feed direction 27 of workpiece 24 and into engagement with the upper surface of workpiece 24.

In this regard, an eyelet 192 is secured to a side edge of hold-down member 128 which is transverse to arcuate cam surface 132, with one end of spring 188 secured to eyelet 192. The opposite end of spring 188 is secured to a threaded rod 194 which forms part of a variable tensioning device 196 for variably adjusting the biasing force of spring 188. Rod 194 extends through an opening 198 in an L-shaped bracket 200 which is secured to guide block 183, and a nut 202 is threaded to the end of rod 194 extending out through opening 198. As a result, hold-down member 128 is pivoted in pivot direction 190 about pivot pin 136 with a biasing force which is variably adjustable by tightening or loosening nut 202.

In operation, the position of hold-down member 128 in lengthwise direction 27 is first adjusted by lengthwise adjustment assembly 140. Thereafter, the position of hold-down member 128 in vertical direction 134 is adjusted by vertical adjustment assembly 142. Nut 202 is then rotated to adjust the spring biasing force.

When workpiece 24 is moved in feed direction 27, for example, for a router operation, spring 188 rotates arcuate cam surface 132 of hold-down member 128 into engagement with the upper surface of workpiece 24 with a light spring tension. Thus, workpiece 24 is pushed down. It is to be pointed out that the material of hold-down member 128 and the spring force on hold-down member 128 do not damage workpiece 24, even if workpiece 24 is made from a soft wood material, such as pine.

As workpiece 24 is moved in the feed direction 27, there may be a tendency for router 26 to impart a force to workpiece 24 which tends to push it in a direction opposite the feed direction 27, that is, to provide a kick-back. With the present invention, however, this results in hold-down member 128 being rotated further in pivot direction 190. As a result, because of the curvature of arcuate cam surface 132, there is a stronger force applied to workpiece 24, which acts against such kick-back in order to prevent or minimize the same. This occurs even through hold-down member 128 is made of a plastic material, a Teflon (trademark) like material, or the like, and may be somewhat slippery.

Thus, in accordance with the present invention, the side and upper surface of workpiece 24 are held or biased, while preventing kick-back thereof. Further, positioning member 28 is adjustable in lengthwise and transverse directions relative to workpiece 24, while hold-down member 128 is adjustable in lengthwise and vertical directions relative to workpiece 24. In addition, the biasing force of the positioning or hold-down member against workpiece 24 is variably adjustable.

Figure 12:
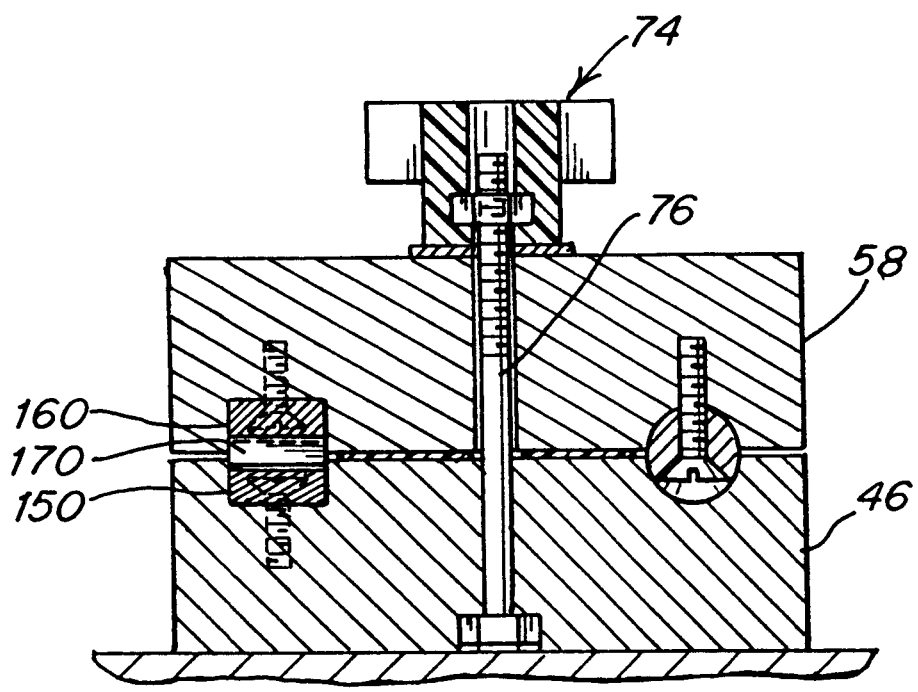
FIG. 12 is a cross-sectional view of the modified embodiment shown in FIGS. 10 and 11, taken along line 12—12 in FIG. 11.

FIGS. 10–12 illustrate a modified embodiment wherein the locking teeth 56, 70 and the side plates are eliminated so as to provide smooth mating (facing) surfaces for guide tracks 44, 46 and guide rail 58. Locking of the members 46, 58 relative to each other is achieved by providing a linear gear rack 150 in each of grooves 50 (of FIG. 1) of each of members 44, 46 and by providing a mating linear gear rack section 160 in the upper clamping part 58 which clamps against the lower gear rack 150. See FIG. 12.

Referring to FIGS. 10–12, the modified embodiment is explained in more detail. As shown in FIGS. 10 and 11, a linear gear rack, such as a spur gear rack manufactured by Boston Gear (part No. L505-4) having a pitch of 24 teeth per inch and a width of about ¼ inch is mounted in mounting groove 164 of each of members 44, 46. The linear gear rack 150 is stationary relative to the respective guide tracks 44, 46. A clamping member 74, which clamps upper guide rail 58 to lower guide rail 46 (see FIG. 12) is provided for tightening the clamping between the upper and lower guide rails 46, 58 and for mutually engaging the teeth of the lower gear rack 150 with the teeth of the upper gear rack 160. The area 170 in FIG. 12 shows the mutually engaged teeth of the upper and lower gear racks 160, 150, respectively. The clamping member 74 in FIG. 12 is similar to the clamping arrangement of FIG. 8, and a detailed description thereof is not given. To move the guide rails 58, 46 relative to each other, the clamping member 74 is loosened, the upper guide rail 58 is lifted so as to bring the teeth of the upper linear gear rack 160 out of engagement with the teeth of lower linear gear rack 150, so that the parts 46, 58 can be moved horizontally relative to each other. After proper location, the clamp member 74 is tightened so as to bring the teeth of the gear rack sections 150, 160 back into engagement with each other, thereby locking member 58 relative to member 46.

The linear gear rack sections 150, 160 are maintained in position by use of screws shown in FIG. 12. Other attachment could be used, such as nails rivets, adhesives, etc.

The reference numerals in FIGS. 10–12 which are the same as in FIGS. 1–9 represent the same or similar articles as in FIGS. 1–9.

As seen in FIG. 11, the lower gear rack section 150 extends horizontally only from point A to point B so as to have a length L, which is substantially shorter than the length of the upper linear gear rack section 160. It is not necessary for the lower linear gear rack section 150 to extend for the full length of the upper gear rack section 160. As seen in the right hand side of FIG. 11, the upper gear rack section has a length L2 which is much greater than length L1 of the upper gear rack section.

As should be clear, the groove 50 shown in FIG. 1 is rounded, whereas the groove for accepting the lower gear rack section 150 is rectangular to accept the gear rack section. Similarly, the upper groove in member 58 is made rectangular so as to accept the upper gear rack section 160. A benefit of the modified arrangement of FIGS. 10–12 is that the locking mechanism is now internal and the user would be less likely to snag a sleeve or other clothing or otherwise contact exposed sawtooth sections, as is possible in the embodiment of FIGS. 1–9.

Referring now to FIGS. 13–19, wherein reference numerals which are the same as in FIGS. 1–12 represent the same or similar articles as in FIGS. 1–12, a modified embodiment of the combination workpiece positioning and anti-kickback device 310 for a work table 12 is shown. In this alternative embodiment the lengthwise adjustment assembly 40 includes first, second and third lengthwise adjustment members 312, 314, 316. The first lengthwise adjustment member 312 is disposed in a gap between the second and third lengthwise adjustment members 314, 316. The second and third lengthwise adjustment members are preferably hollow or have at least an aperture therein such that at least a portion of the first lengthwise adjustment member 312 is slidably received in each of the second and third lengthwise adjustment members 314, 316.

Positioning member 28 is coupled to the first lengthwise adjustment member 312 via a pivot pin 36. The position of the positioning member 28 with respect to the work table 12 and workpiece 24 is adjustable by changing the orientation of the first lengthwise adjustment member 312 in relation to the second and third lengthwise adjustment members 314, 316. That is, if the positioning member 28 needs to be positioned with respect to the work table 12 at a point which is closer to the second lengthwise adjustment member 314, the first lengthwise adjustment member is slidably engaged to a greater extent within the interior portion of the second lengthwise adjusting member 314 and to a lesser extent within the interior portion of the third lengthwise adjusting member 316. Likewise, if the positioning member 28 needs to be positioned with respect to the work table 12 at a position which is closer to the third lengthwise adjustment member 316, the first lengthwise adjustment member is slidably engaged to a greater extent within the third lengthwise adjustment member 316 and to a lesser extent within the interior portion of the second lengthwise adjusting member.

The first lengthwise adjustment member 312 includes a plurality of apertures 318 (preferably holes or notches) along at least one side of its length. Coupled to each of the second and third lengthwise adjustment members is a lengthwise releasable locking device 72 which includes a locking pin 320 (see FIGS. 16 and 19) having a spring 322, which biases the locking pin 320 in engagement with the first lengthwise adjustment member 312, and a knob 324. As a result, when the first lengthwise adjustment member 312 is properly oriented within the second and third lengthwise adjustment members 314, 316 such that the pin is aligned with apertures 318, the locking pins 320 releasably engage the apertures disposed on the first lengthwise adjustment member. The first lengthwise adjustment member 312 is then prevented from movement within the second and third lengthwise adjustment members 314, 316.

The combination workpiece positioning and anti-kickback device of FIGS. 13–19 also includes a transverse adjustment assembly 42. In this embodiment, the transverse adjustment assembly 42 includes transverse releasable locking devices 105 which include first and second clamping devices 326 which are respectively coupled to and near respective ends of the second and third lengthwise adjustment members and corresponding ends of the work table 12. In order to secure the transverse position of the lengthwise adjustment assembly 40, the first and second clamping devices 326, which preferably include a knob 328 having a threaded member 330 are tightened. This secures the transverse position of the lengthwise adjustment assembly on the work table.

Figure 13:
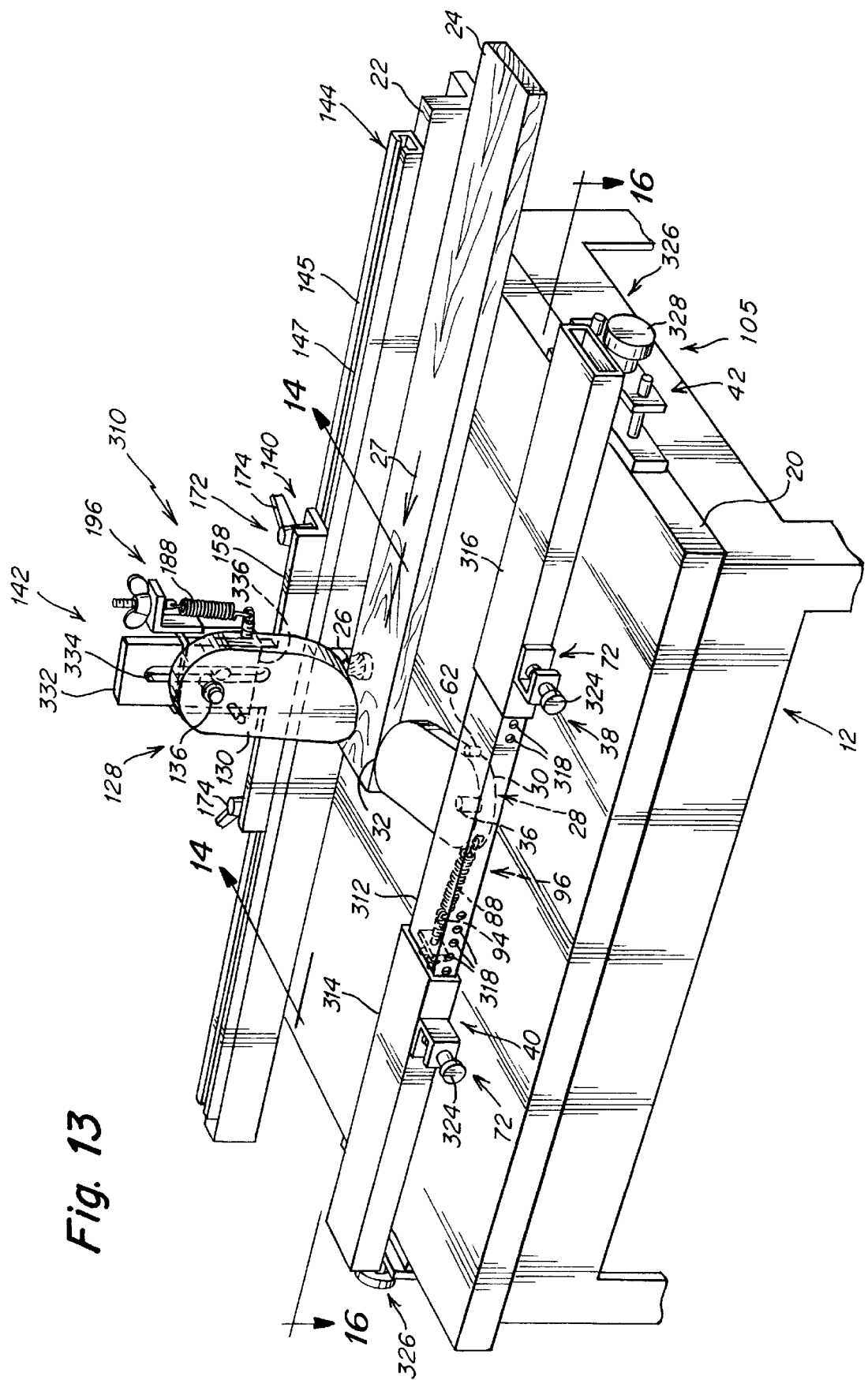
FIG. 13 is a perspective view of the combination workpiece positioning/hold-down and anti-kickback device according to another embodiment of the present invention.
Figure 14:
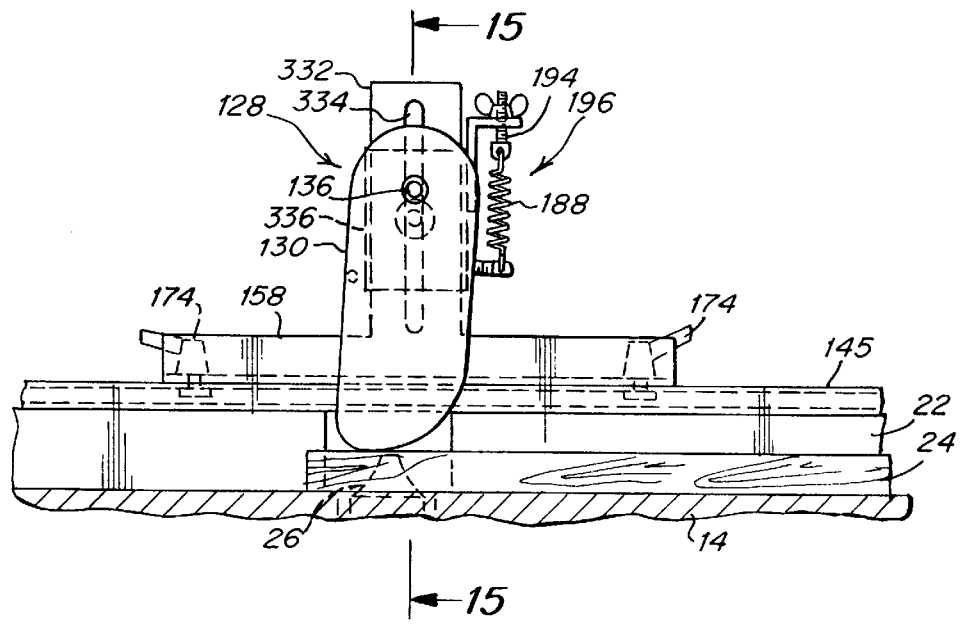
FIG. 14 is a front elevational view, partly in section, of the combination workpiece positioning/hold-down and anti-kickback device, as viewed along line 14—14 of FIG. 13.

In the alternative embodiment shown in FIGS. 13–19, the device also includes a hold-down member 128 which provides a force on a top surface of the workpiece 24 to ensure that the workpiece remains in contact with the table top 14 of the work table 12. The hold-down member includes a lengthwise adjustment assembly 140 and a vertical adjustment assembly 142 as shown in FIG. 13. The lengthwise adjustment assembly is similar to that which is shown in FIG. 1 except that its longitudinal length is shorter due to the configuration of the vertical adjustment assembly as explained below.

Lengthwise adjustment assembly 140 includes a guide track 144 extending in lengthwise direction 27. Guide track 144 is formed by a generally tubular member 145 of a square cross-section and having a slot 147 running the length at the upper surface thereof. Lengthwise adjustment assembly 140 further includes a guide rail 158 slidably mounted on top of guide track 144.

In order to provide sliding movement and to also provide a clamping operation, a lengthwise releasable locking device 172 is provided, which effectively releasably locks lengthwise adjustment assembly 140 relative to work table 12 at a desired location in lengthwise direction 27. Specifically, lengthwise releasable locking device 172 includes a releasable clamping device 174 for releasably clamping guide rail 158 to guide track 144 at a desired location therealong.

Figure 15:
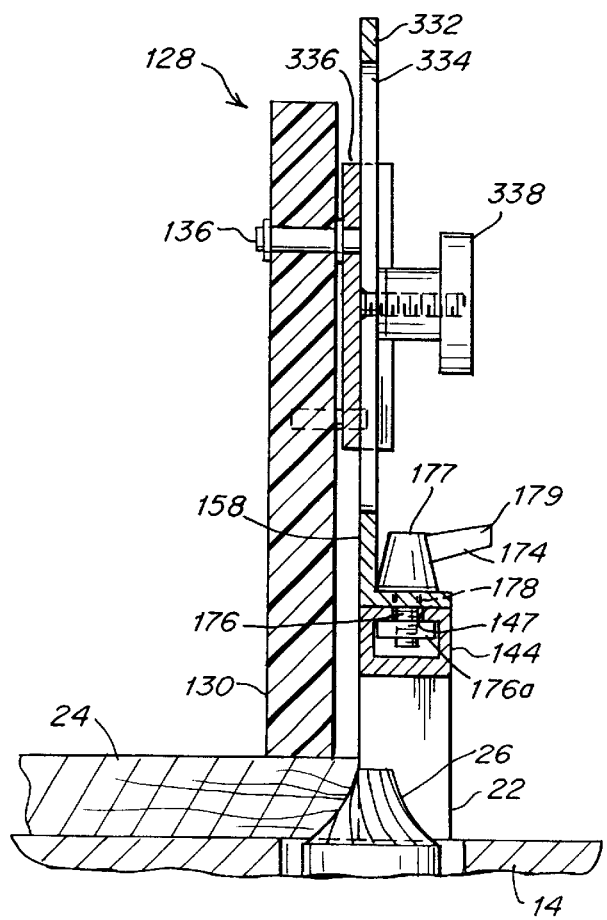
FIG. 15 is an end elevational view, partly in section, of the combination workpiece positioning/hold-down and anti-kickback device, as viewed along line 15—15 of FIG. 14.
Figure 18:
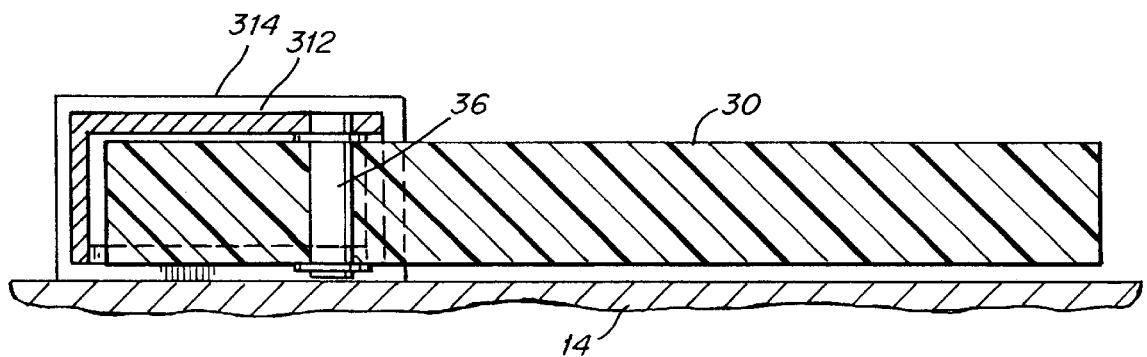
FIG. 18 is a cross-sectional view of the combination workpiece positioning/hold-down and anti-kickback device, taken along line 18—18 of FIG. 17.
Figure 19:
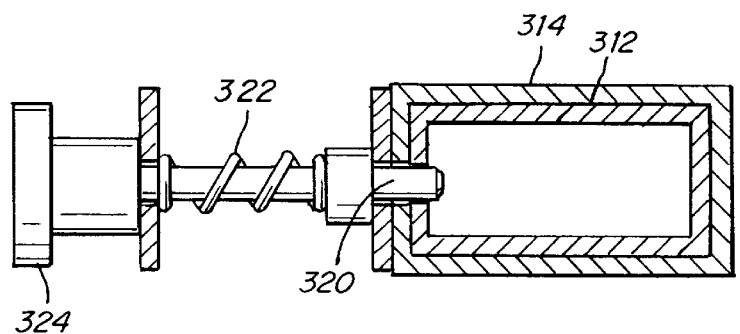
FIG. 19 is a cross-sectional view of the combination workpiece positioning/hold-down and anti-kickback device, taken along line 19—19 of FIG. 17.

As best shown in FIG. 15, releasable clamping device 174 includes a bolt 176 extending through slot 147 and a hole 178 in guide rail 158, with bolt head 176a being received in guide rail 144. The opposite end of bolt 176 extends into guide rail 158 where it is engaged with a clamp 177 having a rotatable handle 179. When handle 179 is rotated in one direction, bolt 176 is pulled up, so that bolt head 176a engages with guide track 144 so as to releasably lock guide rail 158 to guide track 144. When handle 179 is rotated in the opposite direction, bolt 176 is lowered, thereby permitting sliding movement of guide rail 158 on guide track 144 to adjust the lengthwise position thereof.

The vertical adjustment assembly 142 includes a vertical adjustment member 332 operatively coupled to the lengthwise adjustment assembly 140. The vertical adjustment member 332 can be integral and contiguous with the lengthwise adjustment assembly 140. The vertical adjustment member 332 is preferably oriented in non-parallel relation with respect to the work table 12, and preferably is perpendicular or substantially perpendicular to the work table 12. The vertical adjustment member 332 includes a longitudinal aperture 334 along its length which extends through the hold-down member. The hold-down member 128 is coupled to a mounting plate 336 by a pivot pin 136. The pivot pin is fixed to the main body 130 of the hold-down member 128 at a side opposite the arcuate cam surface. The hold-down member 128 is coupled to the vertical adjustment member 332 by a clamping device 338 which extends through the longitudinal aperture 334 of the vertical adjustment member 332 and the mounting plate 336. In operation, the clamping device 338 is loosened and its shaft is moved within the longitudinal aperture 334 such that the height of the hold-down member is fully adjustable in relation to the work table. When the desired height of the hold-down member is attained, the clamping device is tightened to secure the height thereof.

Referring now to FIGS. 20 and 21, wherein reference numerals which are the same as in FIGS. 1–12 represent the same or similar articles as in FIGS. 1–12, an alternative embodiment of the lengthwise releasable locking device 172 and transverse releasable locking device 105 of the combination workpiece positioning an anti-kick back device is shown. The first lengthwise adjustment member 312 slidably engages an interior portion of the second and third lengthwise adjustment members 314, 316 as described in connection with FIGS. 13–19. In this alternative embodiment however, threaded rods 340 are extended through an end of each of the second and third lengthwise adjustment members 314, 316. The end of each of the second and third lengthwise adjustment members 314, 316 through which the threaded rods 340 extend is distal with respect to the positioning member 28. The threaded rods include at one end thereof a knob 342 which enables the threaded rod to be rotated by hand. The opposite end of the threaded rod includes a retaining clip 344 which is fixed on the rod to indicate a maximum displacement of the first lengthwise adjustment member 312 in each lengthwise direction within the second and third lengthwise adjustment members 314, 316.

The position of the first lengthwise adjustment member 312 with respect to the second and third lengthwise adjustment members 314, 316 is altered by rotating at least one of the knobs 342 of the threaded rods 340 which extend within the interior portion of the second and third lengthwise adjustment members and which engage the first lengthwise adjustment member. The rotation of the threaded rods alters the position of the first lengthwise adjustment member and correspondingly the positioning member 28, which is coupled thereto, with respect to the workpiece.

Figure 22:
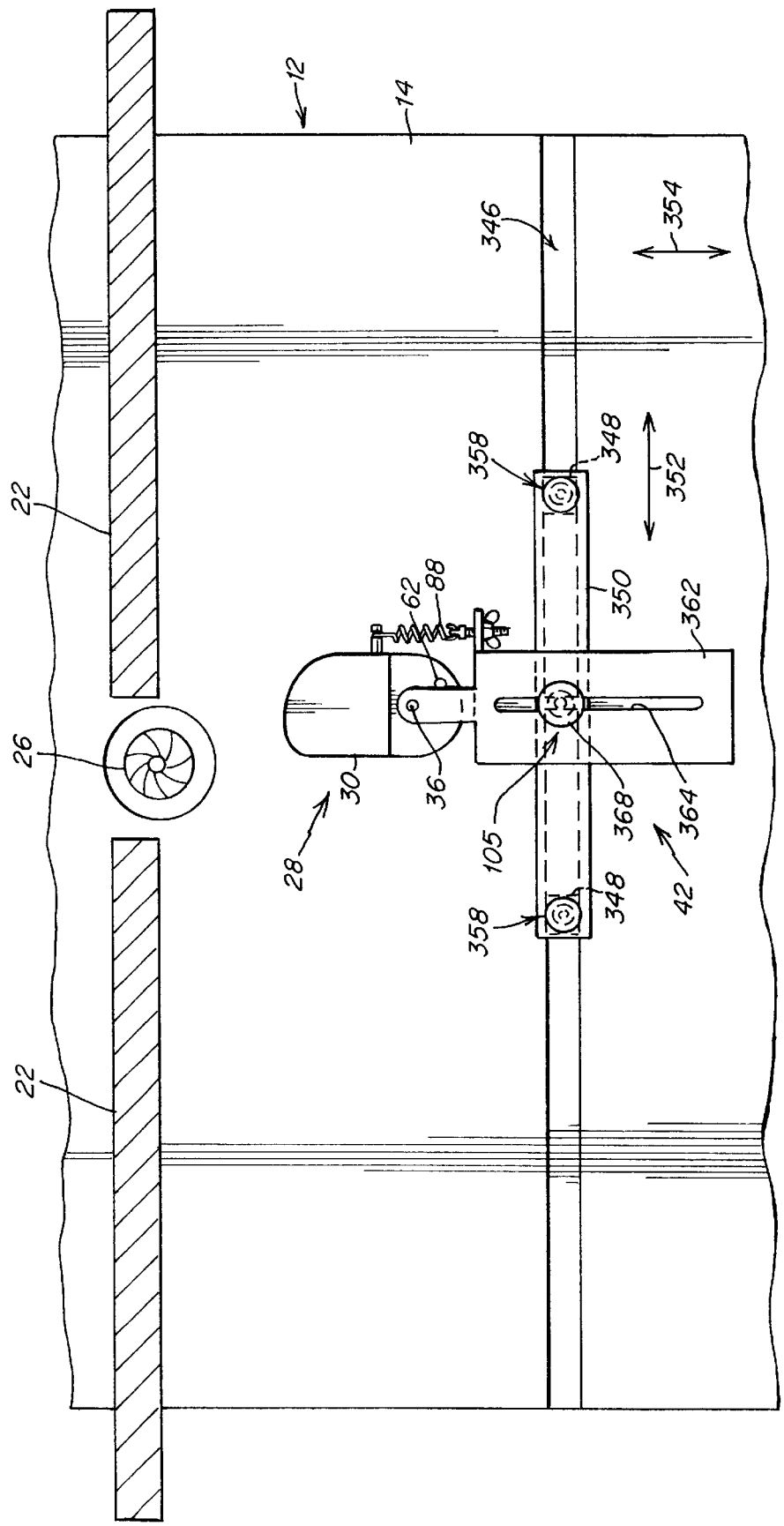
FIG. 22 is a top plan view, partly in section of another modified embodiment of the present invention.
Figure 23:
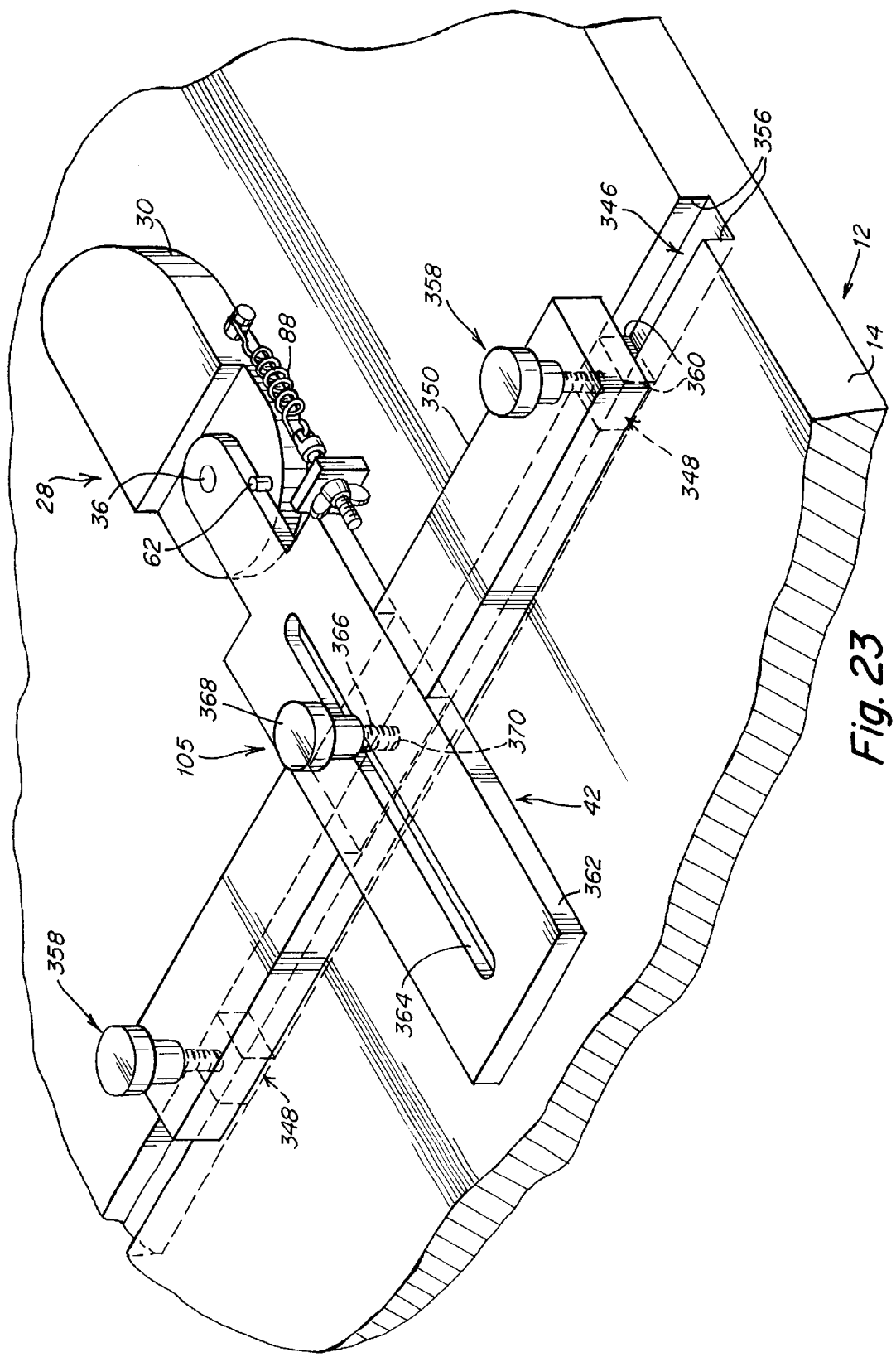
FIG. 23 is a perspective view of the combination workpiece positioning/hold-down and anti-kickback device according to the embodiment shown in FIG. 22.

Referring now to FIGS. 22 and 23, wherein reference numerals which are the same as in FIGS. 1–12 represent the same or similar articles as in FIGS. 1–12, another alternative embodiment of the lengthwise adjustment assembly is shown. In this embodiment the work table 12 includes a groove 346 which is slidably engaged by expansion bolts 348 disposed on the underside of the ends of a lengthwise adjustment member 350. The bolts 348 of the lengthwise adjustment member 350 slidably move within the groove 346 in a longitudinal direction 352, but are prevented from substantial movement in the transverse direction 354. Clamping devices 358, when tightened, expand the sides 360 of the expansion bolts 348 into a tight frictional fit with the sides 356 of the grove 346. As a result, movement of the adjustment member 350 in the longitudinal direction 352 is prevented.

Coupled to the lengthwise adjustment member 350 is a transverse adjustment assembly 42 which is movable in a direction 354 transverse to the lengthwise direction 352. The transverse adjustment assembly adjusts the position of the positioning member 28 in the transverse direction. The positioning member is preferably coupled to one end of a transverse adjustment member 362. The coupling of the positioning member 28 to the transverse adjustment member 362 via pivot pin 36 and the biasing of the positioning member with spring 88 is similar to that previously described and for brevity will not be repeated here.

The transverse adjustment member 362 preferably includes an elongated aperture 364 which extends along the longitudinal length of the transverse adjustment member 362 and therethrough. A transverse releasable locking device 105 is included such as the threaded rod 366, having a knob 368 at one end thereof, as shown in FIG. 23. In this embodiment the lengthwise adjustment member 350 includes an aperture 370 for receiving an end of the threaded rod 366. The threaded rod extends through the elongated aperture 364 of the transverse adjustment member 362 and engages the aperture 370 of the lengthwise adjustment member 350. When in a non-locked position, the locking device 105 enables movement of the transverse adjustment member while the threaded rod remains engaged in the elongated aperture 364 and the aperture 370. When in the locked position, the transverse releasable locking device 105 maintains the position of the transverse adjustment member 362 with respect to the lengthwise adjustment member 350 and, if the lengthwise adjustment member 350 is secured to the work table 12 via clamping devices 358, the orientation of the positioning member 28 with respect to the work table 12.

Referring now to FIGS. 24–34A, an alternative embodiment of the combination workpiece positioning/hold-down and anti-kickback device for a work table is shown. As with the embodiments shown in FIGS. 1–23, the combination workpiece positioning/hold-down and anti-back kickback device 400 according to this alternative embodiment is designed for use with a work table 12 having a table top 14 with an upper surface 16 and opposite transverse sides 18 and 20. As is conventional, a fence 22 is secured at one edge of the worktable 12. During operation, a workpiece 24, such as a length of wood, is positioned on upper surface 16 and against fence 22. Then, a wood working operation is performed by a wood working tool such as a saw, router and the like, while workpiece 24 is moved in the lengthwise direction 27 of the worktable 12 against the fence 22. The device includes a positioning assembly 402 and a hold-down assembly 404.

The positioning assembly 402 includes a lengthwise adjustment assembly 406 and a transverse (widthwise) adjustment assembly 408. The lengthwise adjustment assembly includes first, second and third lengthwise adjustment members 410, 412, 414 which enables the length of the assembly to be adjusted to the length of the worktable. Preferably the length is adjusted to be at least slightly longer than the worktable. The first lengthwise adjustment 410 member preferably sits atop the second and third lengthwise adjustment members 412, 414 (see FIG. 30). In order to achieve this orientation, the first lengthwise adjustment member preferably has an open side or opening 416 of sufficient dimension to receive the second and third lengthwise adjustment members. Each of the second and third lengthwise adjustment members preferably has a plurality protrusions 418 along a top outer surface thereof which engage indentations 420 on the interior top surface of the first lengthwise adjustment member to secure the position of the first, second and third lengthwise adjustment members with respect to one another.

In order to maintain the relative position of the first, second and third lengthwise adjustment members, the lengthwise adjustment assembly includes first and second clamps 422 each of which is disposed in a slot 424 which extends through the first and second lengthwise adjustment members and the first and third lengthwise adjustment members as shown in FIG. 30. The first, second and third lengthwise adjustment members 410, 412, 414 preferably have a plurality of slots 424 along their length so that the clamps can be positioned at a desirable location to secure the adjustment members together depending upon their relative position. The protrusions and indentations 418, 420 preferably extend along substantially the entire length of each respective adjustment member so that the assembly can be extended to a length to accommodate long work tables 12.

In order to secure the positioning adjustment assembly 402 to the worktable and to secure the transverse positioning of the assembly, a transverse adjustment assembly 408 is included which comprises end clamps 426 at both ends 428 of the device. Each end clamp includes a lead screw 430 coupled to a follower 432. The lead screw has a knob 434 attached to one end 436 thereof. The lead screw extends from respective ends of and within the second and third lengthwise adjustment members 412, 414. The second end 430 of the screw is rotatably secured to an interior region 440 of the respective second and third lengthwise adjustment members 412, 414.

In order to secure the positioning assembly 402 to the worktable 12, the lead screw 430 is rotated via the knob 434 such that the follower 432 on each end of the lengthwise adjustment assemblies extends beyond respective opposite transverse sides 18, 20 of the worktable. The knobs are then turned in the opposite direction to rotate the lead screw so as to move the followers toward the respective sides of the worktable. The knobs are preferably turned a sufficient amount to fixedly secure the follower and correspondingly the device to the worktable. The position of securement of the positioning assembly is determined based on the dimensions of the workpiece being cut on the worktable and the size of the positioning member so that the positioning member provides the desired positioning and anti-kickback effect on the workpiece.

The follower 432 preferably includes a non-slip pad 442 secured to the portion of the follower which contacts the opposite transverse sides 18, 20 of the worktable to prevent the positioning assembly from moving relative to the worktable 12 once attached thereto.

Figure 24:
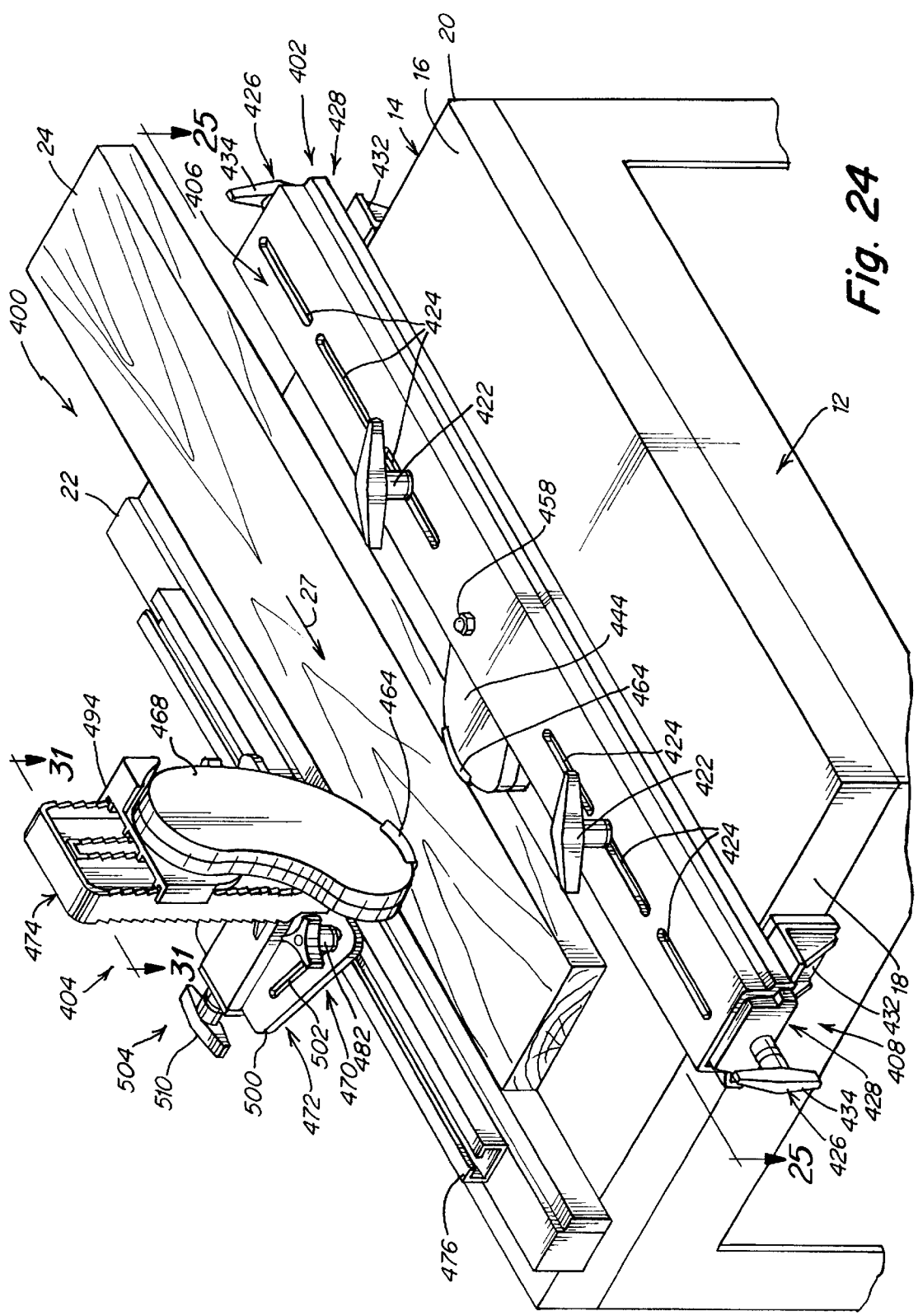
FIG. 24 is a perspective view of the combination workpiece positioning/hold-down and anti-kickback device according to another embodiment of the present invention.

The workpiece positioning and anti-kickback device also includes a positioning member 444 similar to those described in connection with the previous embodiments. The positioning member of the present embodiment is, however, fixed within an interior portion 446 of the positioning assembly 402 as shown in FIG. 24.

The positioning member 446 preferably includes first and second halves 448, 450 as shown in FIG. 30. In contrast to the prior embodiments, the positioning member of the present embodiment includes a torsion spring 452 disposed within the positioning member. The positioning member also includes a bolt 454 and hub 456. A first end of the torsion spring is disposed about and operatively coupled to the hub, and the bolt extends through the hub and spring. Preferably, one end of the bolt extends out of the other half of the positioning member and is secured to the positioning assembly via a cap nut 458 as shown in FIG. 25. At least one of the two halves of the positioning member includes an anchor 460 on an interior portion thereof for operative displacement against the second end of the torsion spring so as to bias the positioning member 446 in a position perpendicular to the positioning assembly as shown in FIG. 25. Two screws 462 are preferably utilized to hold the two halves 448, 450 of the positioning member together (see FIG. 29).

The positioning member 444 also includes interchangeable cam pieces 464. The interchangeable cam pieces are disposed on the positioning member at a portion which substantially continually contacts the workpiece during cutting of the workpiece 24. The interchangeable cam pieces are important in that the surface of the positioning member which engages the workpiece can become worn. By having the interchangeable cam pieces, only the interchangeable cam piece will wear and can be replaced as opposed to replacing an entire positioning member which would be more costly and wasteful.

The interchangeable cam piece can include a compressible material 466 such as rubber over the exterior surface thereof which specifically contacts the workpiece to provide additional anti-kickback properties by more strongly securing the workpiece when a kickback occurs. This has been found to be very effective when cutting workpieces which are very hard substances such as oak. It is foreseen that the compressible material could comprise all of the interchangeable cam piece.

Referring now to FIGS. 24, 24A and 31–34A, the combination workpiece positioning/hold-down and anti-kickback device also includes the hold-down assembly 404 having a hold-down member 468 which provides a force on a top surface of the workpiece 24 to insure that the workpiece remains in contact with the table top 14 of the worktable 12 and which prevents kick-back of the workpiece. The hold-down member 468 includes a lengthwise adjustment assembly 470, a transverse adjustment assembly 472, and a vertical adjustment assembly. The lengthwise adjustment assembly includes a guide track 476 extending in lengthwise direction 27. The guide track is formed by a generally tubular member of a square cross-section and has a slot 478 running its length at the upper surface thereof. In order to provide sliding movement and to also provide a clamping operation, a lengthwise releasable locking device 480 is provided which effectively releasably locks the lengthwise adjustment assembly 470 relative to the worktable 12 at a desired location in lengthwise direction 27. Specifically, the lengthwise releasable locking device 480 includes a releasable clamp 482 for clamping the vertical unit to the guide track at a desired location there along.

Figure 32:
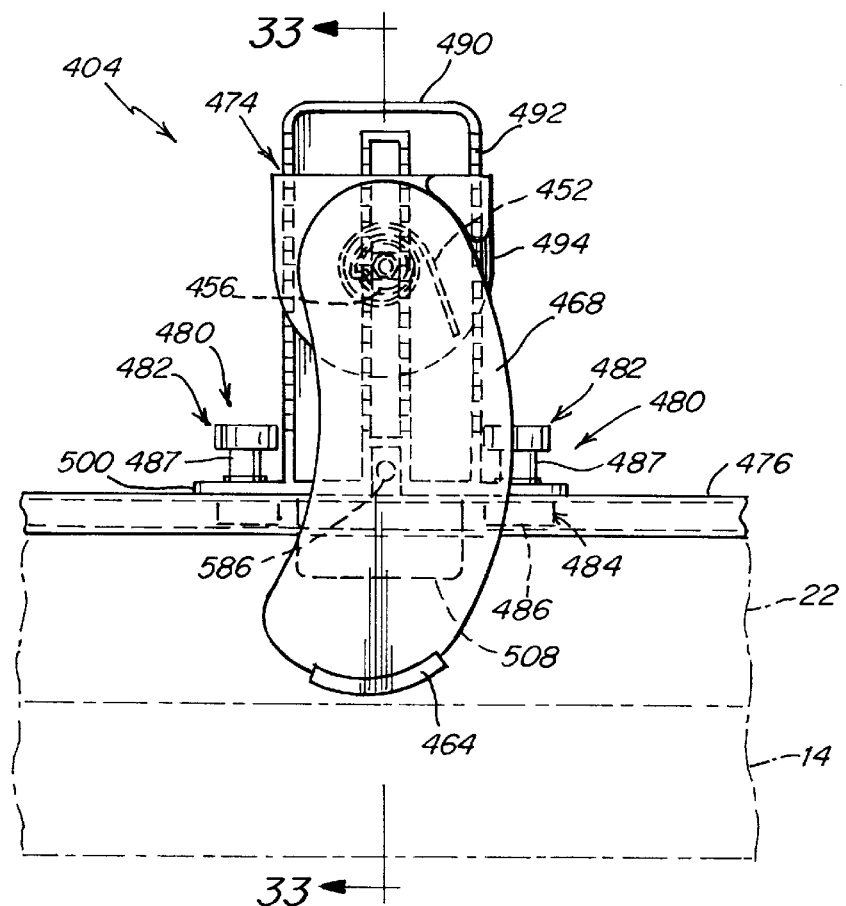
FIG. 32 is a front elevational view of the vertical hold-down unit taken along line 32—32 of FIG. 31.
Figure 33:
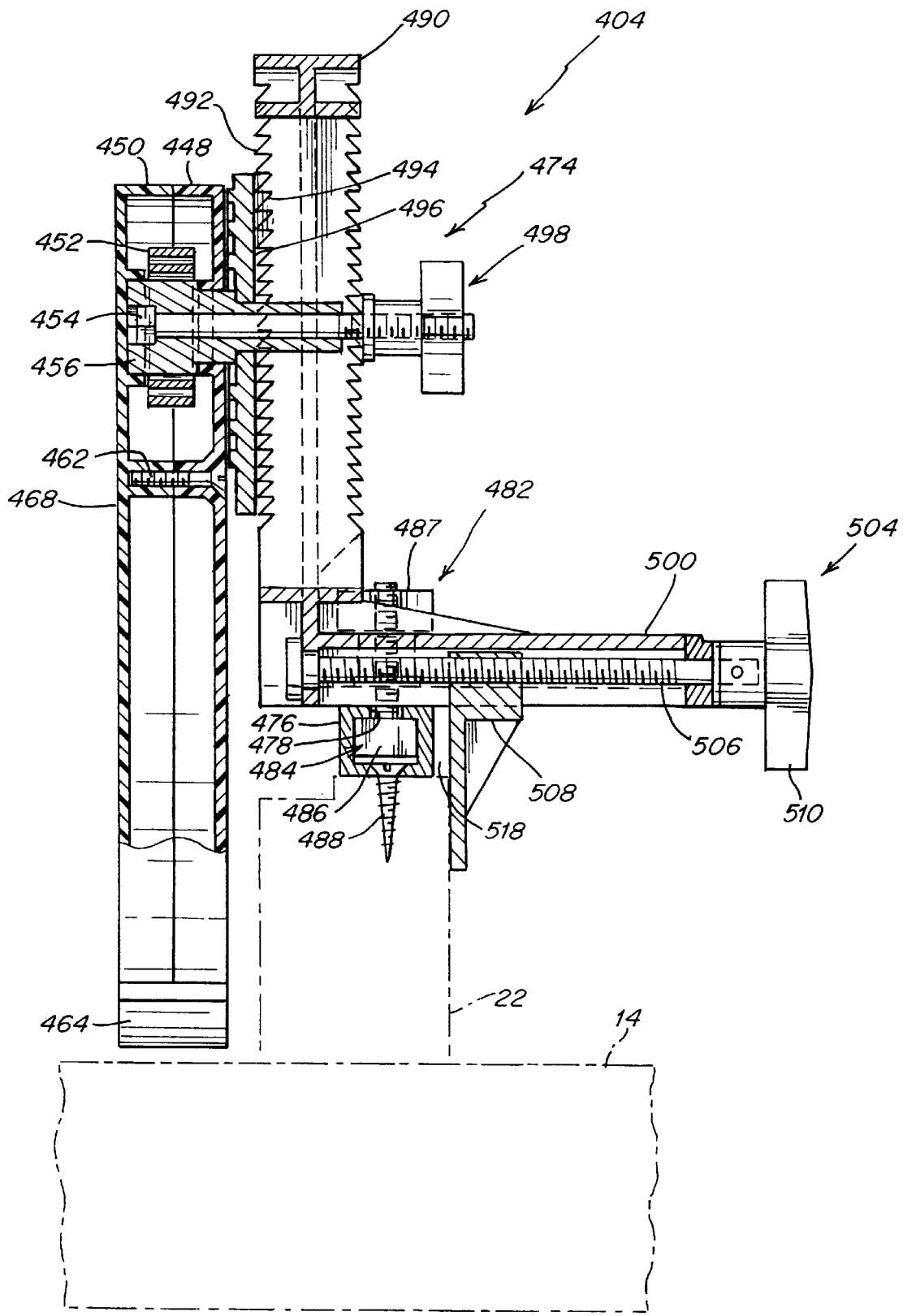
FIG. 33 is a cross-sectional view of the vertical hold-down unit taken along line 33—33 of FIG. 32.

As best shown in FIGS. 32 and 33, the releasable clamp 482 includes a bolt 484 extending through slot 478 in the guide track 476, with the bolt head (expansion bolt) 486 being received in the guide track. The opposite end of the bolt extends out of the guide rail where it is engaged by a rotatable handle 487. The bolts of the lengthwise adjustment member slidably move within the slot in a longitudinal direction, but are prevented from substantial movement in the transverse direction. The clamping devices 482 when tightened, expand the sides of the expansion bolts 486 into a tight frictional fit with the sides of the slot. As a result, movement of the lengthwise adjustment assembly 470 in the longitudinal direction 27 is prevented. The guide track can be secured to the fence 22 using any known conventional methods of attachment such as a screw 488 as shown in FIG. 33. If the worktable already has a T-slotted track or rail, the track described above need not be secured to the fence. It is also foreseen that a standard T-nut could be employed as the releasable clamp.

Figure 33A:
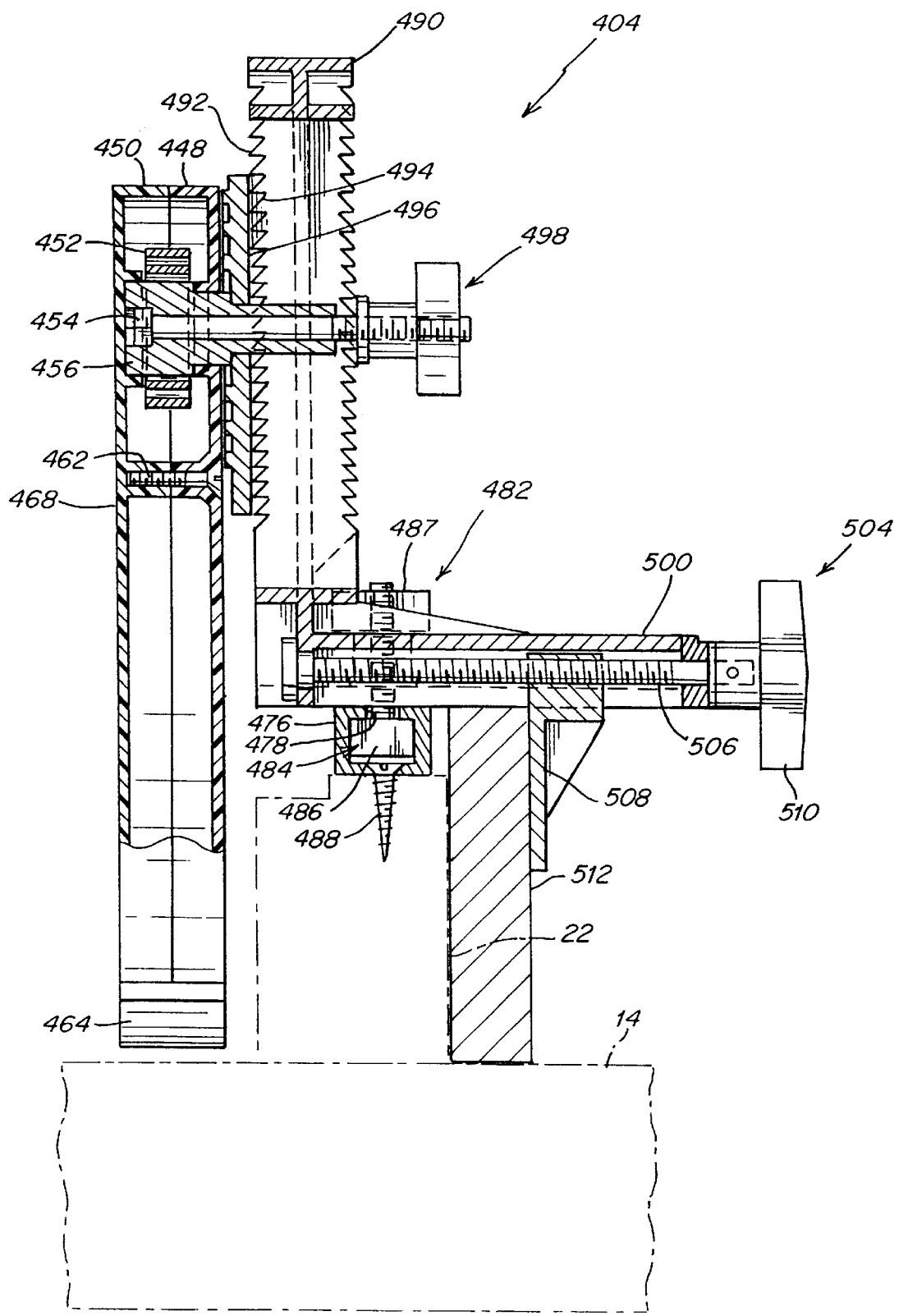
FIG. 33A is a cross-sectional side view of an alternate arrangement of the vertical hold-down unit which includes a filler strip.

The hold down assembly also includes a vertical adjustment assembly 474 having a vertical adjustment member 490 operatively coupled to the lengthwise adjustment assembly 470. The vertical adjustment member is preferably contiguous with the lengthwise adjustment assembly to provide a more strong and secure device. The vertical adjustment member is preferably oriented in non-parallel relation with respect to the worktable 12 and preferably is perpendicular or substantially perpendicular to the worktable 12. The vertical adjustment member 490 preferably includes a saw-toothed surface 492 extending along the length of the surface 496 which is proximate the hold-down member 468. The hold-down member (described below) is operatively coupled to a mounting plate 494 which has a complementary saw-toothed surface which fixedly engages with the saw-toothed surface of the vertical adjustment assembly as shown in FIG. 33. The hold-down member is fixedly coupled to the vertical adjustment member by a clamping device 498 which extends through the vertical adjustment member 490, the mounting plate 494 and at least partially through the hold-down member 468 as shown in FIG. 33A.

In operation, the clamping device is loosened such that the saw-toothed engagement of the mounting plate and vertical adjustment member can be adjusted in the vertical direction to adjust to the thickness of the workpiece. When the desired height of the hold-down member is attained, the saw-toothed surfaces engage, and the clamping device 498 is tightened to secure the height thereof and the engagement of the saw-toothed mounting plate to the saw-toothed mounting strip. The use of the saw-toothed surfaces provides added strength and stability to the vertical adjustment member so that slippage will not occur when the force caused by the cutting operation is applied thereto.

In addition to adjusting the position of the hold-down member with respect to the height of the workpiece 24 and length of the worktable, the vertical adjustment assembly also includes a width (transverse) adjustment assembly 472 which enables the hold-down member 468 to be positioned across the width of the worktable 12 so as to engage a center portion of a side of the workpiece. The position of the hold-down member across the width of the table is determined based upon the width of the work piece.

Figure 31:
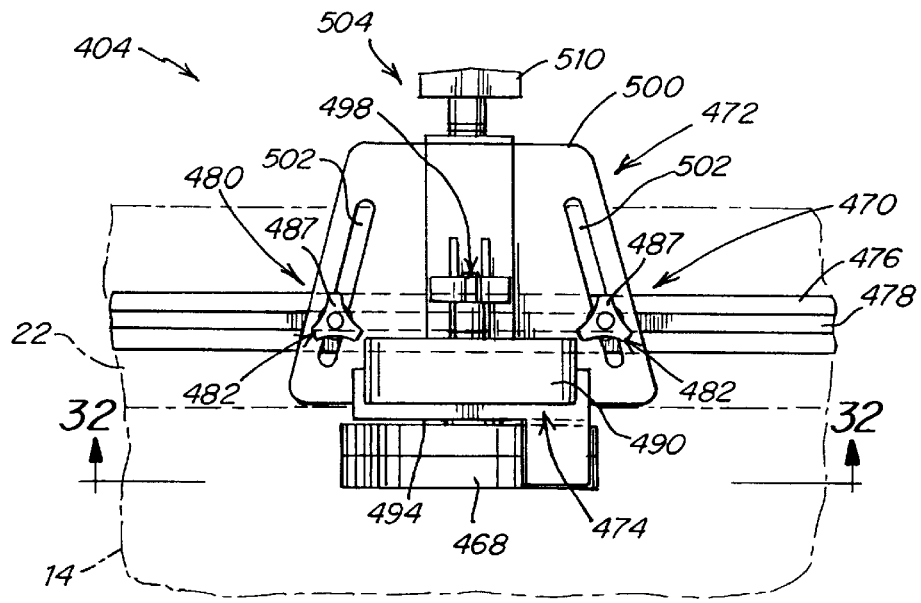
FIG. 31 is a top plan view of the vertical hold-down unit taken along line 31—31 of FIG. 24.

The width adjustment assembly includes a mounting plate 500 fixedly secured to the vertical adjustment assembly 474. The width adjustment assembly is preferably perpendicular or at least substantially perpendicular to the vertical adjustment assembly. The width adjustment assembly includes first and second slots 502 along the length of the mounting plate, the width adjustment assembly being oriented substantially perpendicular to the lengthwise direction of the worktable. In the preferred embodiment the lengthwise releasable locking device 480 discussed above also functions as the widthwise releasable locking device. The widthwise releasable locking device extends through the first and second slots 502 and engages the guide track 476 as explained above in connection with the lengthwise adjustment member. The slots in the mounting plate may be parallel to one another. However, in the preferred embodiment the slots are preferably non-parallel and are preferably angled toward one another as shown in FIG. 31 such that once the expansion nuts frictionally engage the rail to fix the transverse and widthwise position of the hold-down member, movement in the widthwise direction is less likely because any force in the widthwise direction would be directed against a side of the slot and to the mounting plate to further impede any unwanted widthwise movement.

As shown in FIG. 33, the hold-down assembly 404 also includes a clamp 504 including a lead screw 506, follower 508 and handle 510. The lead screw preferably extends through a portion of the widthwise adjustment plate and is secured to an interior portion thereof. As the lead screw is rotated by the handle, the follower is moved toward the guide track 476 and fence 22 and fixedly pressed thereto. The pressure of the follower against the guide rail and fence prevents the vertical hold-down unit from toppling in either the longitudinal or widthwise direction of the worktable due to forces exerted on the device during the cutting and hold-down operation. This provides more stability to the device.

Referring now to FIG. 33A, a filler-strip 512 maybe inserted between the contact surface of the follower 508 and the guide rail 476 and fence 22 of the worktable 12. The filler strip provides a more stable contact surface for the follower because the entire surface of the follower abuts the filler strip. It is also foreseen that the contact surface of the follower may include an anti-slippage material to prevent relative movement between the contact surface of the follower and the filler strip.

It is also foreseen that the filler strip may not extend the entire height of the fence and guide track as shown in FIG. 33A, but will instead fill a gap 514 (space) between the width of the fence and the width of the guide rail (see FIG. 33) such that the entire contact surface of the follower engages a surface of either the filler strip or the fence.

In an alternative embodiment of the present invention as shown in FIG. 24A, two vertical hold-down units 468 are positioned on the worktable 12. It is foreseen that depending upon the length of the workpiece 24, any number of vertical hold-down units could be positioned on the worktable to hold down the workpieces and to prevent kickback. However, it should be noted that one vertical hold-down unit is only necessary to prevent kickback. By adding additional hold-down units, the workpiece is kept more stable during the cutting, routing or milling process.

Figure 34:
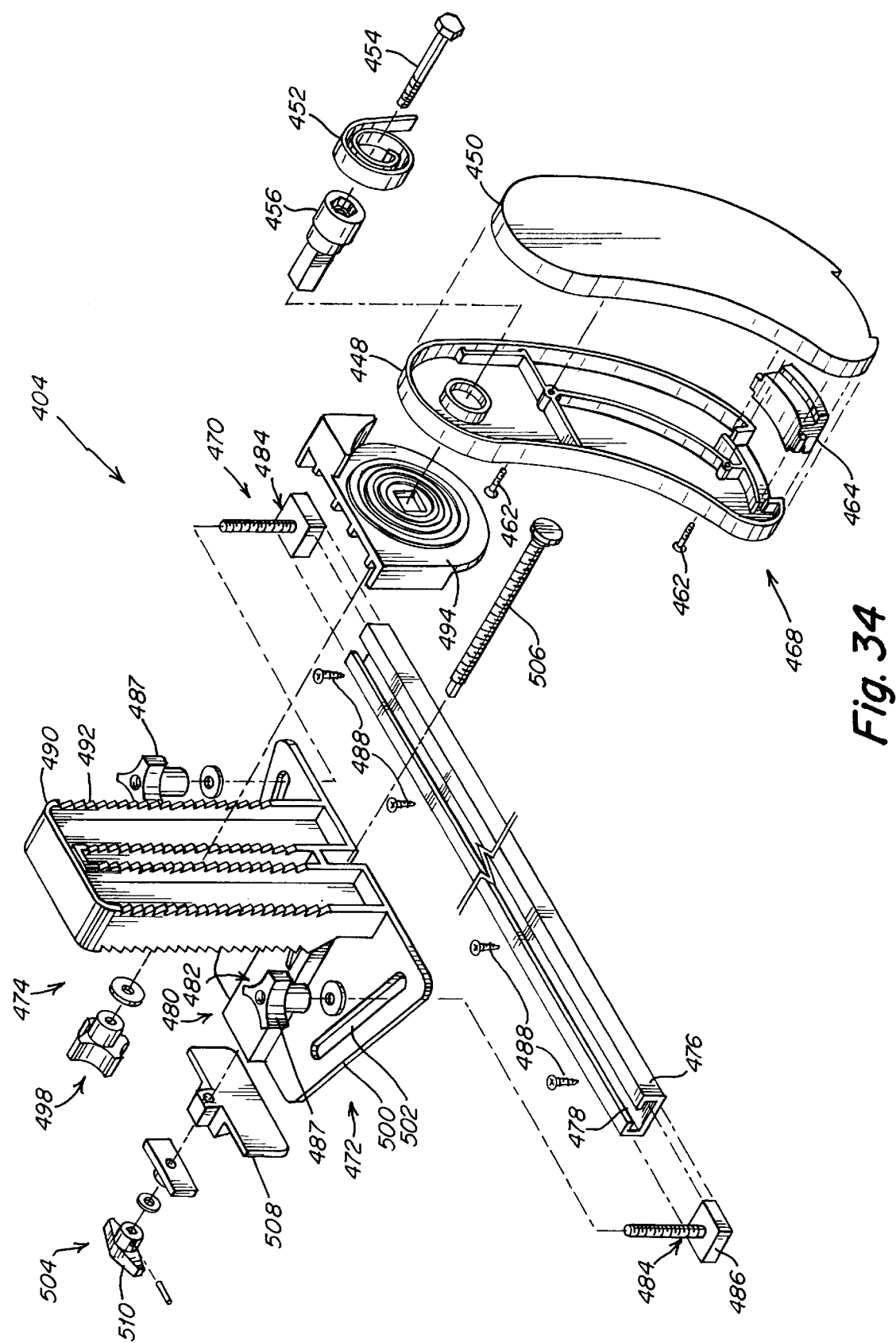
FIG. 34 is an exploded perspective view of the vertical unit of FIG. 24.
Figure 34A:
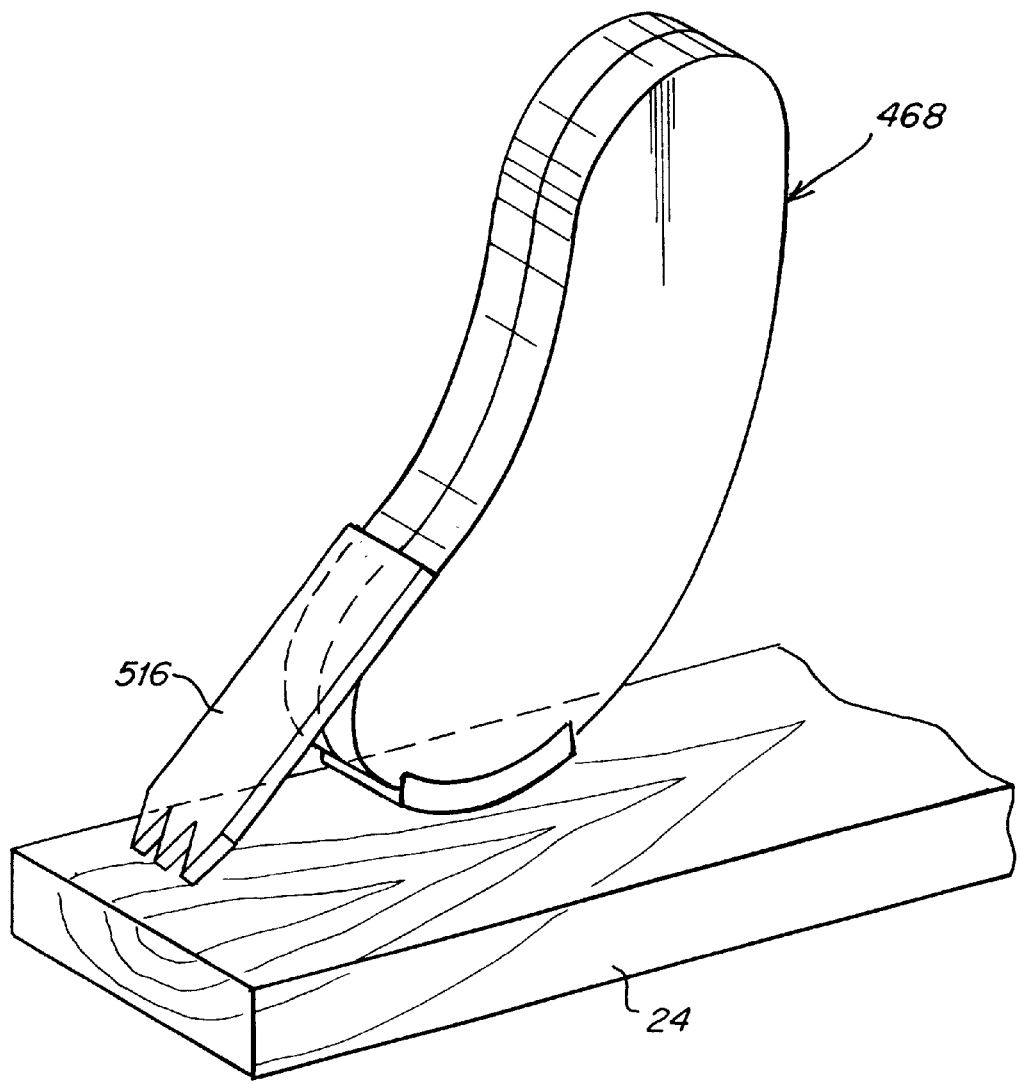
FIG. 34A is a fragmentary perspective view of an alternate embodiment of the cam attachment for the vertical hold-down unit.

Referring now to FIG. 34, an alternative embodiment of the hold-down member of the vertical hold-down assembly is shown. The hold-down member includes a forked member 516 on the surface thereof for hardwoods which assist in preventing kickback of a workpiece. It has been found that this configuration provides better anti-kickback protection when the workpiece is made of a hard wood such as oak.

It is foreseen that the hold-down member which is attached to the vertical hold-down assembly and the positioning member of the same construction positioning member of the positioning assembly can have or differing constructions.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention as defined by the appended claims.

What is claimed is:

1. A combination workpiece positioning and anti-kickback device for a work table having a fence against which a workpiece is guided, comprising:
    a positioning member having a main body, and an arcuate cam surface at one edge of the main body for engaging a side surface of a workpiece on the work table;
    an adjustment device for moving the positioning member relative to the workpiece, the adjustment device including:
        a lengthwise adjustment assembly movable in a lengthwise direction of movement of the workpiece along the work table for adjusting the position of the positioning member in said lengthwise direction, and
        a transverse adjustment assembly movable in a direction transverse relative to said lengthwise direction for adjusting the position of the positioning member in the transverse direction, the transverse adjustment assembly being movably connected to the lengthwise adjustment assembly;
    a lengthwise releasable locking device for releasably locking the lengthwise adjustment assembly relative to the work table at a desired location in the lengthwise direction;
    a transverse releasable locking device for releasably locking the transverse adjustment assembly relative to the work table at a desired location in the transverse direction;
    a pivot which pivotally mounts the positioning member to the adjustment device for pivoting movement; and
    a spring for biasing the positioning member with a biasing force in a first pivot direction about said pivot such that said arcuate cam surface is biased in a direction opposite to a feed direction of said workpiece and into engagement with the side surface of the workpiece;
    wherein said lengthwise adjustment assembly includes at least first and second lengthwise adjustment members, the first lengthwise adjustment member being received within an interior portion of the second lengthwise adjustment member.

2. The combination workpiece positioning and anti-kickback device according to claim 1, wherein said first lengthwise adjustment member includes a plurality of indentations along at least one interior surface thereof and the second lengthwise adjustment member includes a plurality of protrusions along at least one exterior surface thereof to releasably engage with the plurality of indentations of the first lengthwise adjustment member, at least one of the plurality of indentations of the first lengthwise adjustment member being engaged with at least one of the plurality of protrusions of the second lengthwise adjustment member to maintain the relative positions of the first and second lengthwise adjustment members.

3. The combination workpiece positioning and anti-kickback device according to claim 1, wherein the first and second lengthwise adjustment members include slots which extend therethrough and which are at least partially alignable, and wherein the lengthwise releasable locking device comprises a locking clamp operatively coupled to said first and second lengthwise adjustment members for releasably securing the at least one of the plurality of protrusions of the first lengthwise adjustment member between the first and second protrusions of the second lengthwise adjustment member such that the first lengthwise adjustment member is releasably coupled to the second lengthwise adjustment member and such that the positioning member is situated at a desired lengthwise location on the work table.

4. The combination workpiece positioning and anti-kickback device according to claim 1, wherein said lengthwise adjustment assembly further comprises a third lengthwise adjustment member having a plurality of protrusions along at least one exterior surface thereof to releasably engage with the plurality of indentations of the first lengthwise adjustment member such that at least one of the plurality of indentations of the first lengthwise adjustment member is engaged with at least one of the plurality of protrusions of the third lengthwise adjustment member, the third lengthwise adjustment member being received within an interior portion of the first lengthwise adjustment member.

5. The combination workpiece positioning and anti-kickback device according to claim 4, wherein the first and third lengthwise adjustment members include slots which extend therethrough and which are at least partially alignable, and wherein the lengthwise releasable locking device comprises a locking clamp operatively coupled to said first and third lengthwise adjustment members for releasably securing the at least one of the plurality of protrusions of the first lengthwise adjustment member between the first and second protrusions of the third lengthwise adjustment member such that the first lengthwise adjustment member is releasably coupled to the third lengthwise adjustment member and such that the positioning member is situated at a desired lengthwise location on the work table.

6. The combination workpiece positioning and anti-kickback device according to claim 4, wherein said third lengthwise adjustment member is substantially collinear with said second lengthwise adjustment member with a gap between said second and third lengthwise adjustment members in which at least a part of said first lengthwise adjustment member is located.

7. The combination workpiece positioning and anti-kickback device according to claim 4, wherein said transverse releasable locking device comprises:
    first and second releasable clamps each having at least a lead screw, follower and handle, the follower being operatively coupled to a non-end portion of the lead screw, the handle being coupled to an end portion of the lead screw and extending from an end of the second and third lengthwise adjustment members, the first and second releasable clamps being respectively secured to said second and third lengthwise adjustment members for moving said followers into releasable engagement with the work table to fixedly secure the combination workpiece positioning and anti-kickback device to the work table, the threaded rod and follower having an adjustable distance therebetween.

8. The combination workpiece positioning and anti-kickback device according to claim 1, wherein at least a portion of said main body is contained within said lengthwise adjustment assembly, said main body is oriented substantially in said transverse direction, and said arcuate cam surface has a curvature with an increasing radius in a direction opposite to the direction of movement of said workpiece along the work table such that smaller radius portions of said arcuate cam surface extend closer toward the workpiece than larger radius portions of said arcuate cam surface.

9. The combination workpiece positioning and anti-kickback device according to claim 1, wherein said main body includes a replaceable cam surface piece disposed on the main body at a point where the workpiece engages the arcuate cam surface.

10. The combination workpiece positioning and anti-kickback device according to claim 9, wherein the replaceable cam surface piece comprises a compressible material.

11. The combination workpiece positioning and anti-kickback device according to claim 1, wherein said pivot pivotally mounts the positioning member to the lengthwise adjustment member for pivoting movement.

12. The combination workpiece positioning and anti-kickback device according to claim 1, further comprising a stop disposed on said lengthwise adjustment assembly for limiting pivotal movement of said positioning member.

13. The combination workpiece positioning and anti-kickback device according to claim 1, wherein said spring is operatively coupled to said pivot and is contained within the hold-down member.

14. The combination workpiece positioning and anti-kickback device according to claim 1, further comprising a positioning adjustment member including a threaded rod extending through an interior portion of the second lengthwise adjustment member and being operatively engaged with the first lengthwise adjustment member for altering and fixing a position of the first adjustment member with respect to the second adjustment member.

15. A combination workpiece hold-down and anti-kickback device for a work table having a fence against which a workpiece is guided, comprising:
 a hold-down member having a main body, and an arcuate cam surface at one edge of the main body for engaging an upper surface of a workpiece on the work table;
 an adjustment device for moving the hold-down member relative to the workpiece, the adjustment device including:
  a lengthwise adjustment assembly movable in a lengthwise direction of movement of the workpiece along the work table for adjusting the position of the hold-down member in said lengthwise direction,
  a transverse adjustment assembly movable in a direction transverse to said lengthwise direction for adjusting the position of the hold-down member in the transverse direction, the transverse adjustment assembly being connected to the lengthwise adjustment assembly; and
  a vertical adjustment assembly movable in a vertical direction transverse to said lengthwise and transverse directions for adjusting the position of the hold-down member in the vertical direction, the vertical adjustment assembly being movably connected to the transverse lengthwise adjustment assemblies;
 a lengthwise releasable locking device for releasably locking the lengthwise adjustment assembly relative to the work table at a desired location in the lengthwise direction;
 a transverse releasable locking device for releasably locking the transverse adjustment assembly relative to the worktable at a desired location in the transverse direction;
 a vertical releasable locking device for releasably locking the vertical adjustment assembly relative to the work table at a desired location in the vertical direction;
 a pivot which pivotally mounts the hold-down member to the adjustment device for pivoting movement; and
 a spring for biasing the hold-down member with a biasing force in a first pivot direction about said pivot such that said arcuate cam surface is biased in a direction opposite to a feed direction of said workpiece and into engagement with the upper surface of the workpiece.

16. The combination workpiece hold-down and anti-kickback device according to claim 15, wherein said vertical adjustment assembly includes a vertical adjustment member operatively coupled to said lengthwise adjustment assembly, said vertical adjustment member including a plurality of protrusions extending along a surface thereof which faces the hold-down member, the hold-down member being operatively coupled to a mounting plate via the pivot, the mounting plate has a plurality of protrusions which extend along a surface thereof which faces the vertical adjustment member, the protrusions of the vertical adjustment member being engageable with spaces between the protrusions of the mounting plate, and a first clamping device engaging said vertical adjustment member and mounting plate so as to releasably fix the mounting plate relative to the vertical adjustment member to fix a height of the hold-down member with respect to the work table.

17. The combination workpiece hold-down and anti-kickback device according to claim 16, wherein said clamping device operatively engages said hold-down member.

18. The combination workpiece hold-down and anti-kickback device according to claim 16, wherein the plurality of protrusions along the surface of the vertical adjustment member and mounting plate comprise a complementary saw-toothed arrangement.

19. The combination workpiece hold-down and anti-kickback device according to claim 15, wherein said main body is oriented substantially in said vertical direction, and said arcuate cam surface has a curvature with an increasing radius in a direction opposite to the direction of movement of said workpiece along the work table such that smaller radius portions of said arcuate cam surface extend closer toward the workpiece than larger radius portions of said arcuate cam surface.

20. The combination workpiece positioning and anti-kickback device according to claim 15, wherein said main body includes a replaceable cam surface piece disposed on the main body at a point where the workpiece engages the arcuate cam surface.

21. The combination workpiece positioning and anti-kickback device according to claim 20, wherein the replaceable cam surface piece comprises a compressible material.

22. The combination workpiece hold-down and anti-kickback device according to claim 15, wherein said lengthwise adjustment assembly includes a guide track extending in said lengthwise direction, and a guide rail movable in said guide track in said lengthwise direction, with said vertical and traverse adjustment assemblies being mounted to said guide rail.

23. The combination workpiece hold-down and anti-kickback device according to claim 22, wherein said lengthwise releasable locking device includes a releasable clamping device for releasably clamping the guide rail to the guide track at a desired location therealong.

24. The combination workpiece hold-down and anti-kickback device according to claim 15, wherein said pivot pivotally couples the hold-down member to the vertical adjustment member for pivoting movement.

25. The combination workpiece hold-down and anti-kickback device according to claim 15, further comprising a stop on said vertical adjustment assembly for limiting pivotal movement of said hold-down member.

26. The combination workpiece hold-down and anti-kickback device according to claim 15, wherein said spring is operatively coupled to said pivot and is contained within the hold-down member.

27. The combination workpiece hold-down and anti-kickback device according to claim 15, wherein said transverse adjustment assembly comprises a transverse adjustment member, operatively coupled to the lengthwise adjustment member, the transverse adjustment member having at least one slot therethrough and said transverse releasable clamping device extending through said slots to engage the guide track.

28. The combination workpiece hold-down and anti-kickback device according to claim 27, wherein the at least one slot has a length which extends in a direction which is non-parallel and non-perpendicular with respect to the guide track.

29. The combination workpiece hold-down and anti-kickback device according to claim 15, wherein the lengthwise releasable locking device and the transverse releasable locking device comprise the same locking device.

30. The combination workpiece hold-down and anti-kickback device according to claim 15, wherein the hold-down member comprises an anti-kickback extension for preventing kick-back of the workpiece.

31. The combination workpiece hold-down and anti-kickback device according to claim 30, wherein the anti-kickback extension comprises a saw-toothed arrangement which engages the workpiece upon partial kick-back of the workpiece.

32. A combination workpiece positioning, hold-down and anti-kickback device for a work table having a fence against which a workpiece is guided, comprising:

a positioning member having a main body, and an arcuate cam surface at one edge of the main body for engaging a side surface of a workpiece on the work table;

an adjustment device for moving the positioning member relative to the workpiece, the adjustment device including:

a lengthwise adjustment assembly movable in a lengthwise direction of movement of the workpiece along the work table for adjusting the position of the positioning member in said lengthwise direction, and a transverse adjustment assembly movable in a direction transverse relative to said lengthwise direction for adjusting the position of the positioning member in the transverse direction, the transverse adjustment assembly being movably connected to the lengthwise adjustment assembly;

a lengthwise releasable locking device for releasably locking the lengthwise adjustment assembly relative to the work table at a desired location in the lengthwise direction;

a transverse releasable locking device for releasably locking the transverse adjustment assembly relative to the work table at a desired location in the transverse direction;

a pivot which pivotally mounts the positioning member to the adjustment device for pivoting movement;

a spring for biasing the positioning member with a biasing force in a first pivot direction about said pivot such that said arcuate cam surface is biased in a direction opposite to a feed direction of said workpiece and into engagement with the side surface of the workpiece;

a hold-down member having a main body, and an arcuate cam surface at one edge of the main body for engaging an upper surface of the workpiece on the table;

an adjustment device for moving the hold-down member relative to the workpiece, the adjustment device including:

a lengthwise adjustment assembly movable in a lengthwise direction of movement of the workpiece along the work table for adjusting the position of the hold-down member in said lengthwise direction, a transverse adjustment assembly movable in a direction transverse to said lengthwise direction for adjusting the position of the hold-down member in the transverse direction, the transverse adjustment assembly being movably connected to the lengthwise adjustment assembly; and a vertical adjustment assembly movable in a vertical direction transverse to said lengthwise and transverse directions for adjusting the position of the hold-down member in the vertical direction, the vertical adjustment assembly being movably connected to the transverse lengthwise adjustment assemblies;

a lengthwise releasable locking device for releasably locking the lengthwise adjustment assembly relative to the work table at a desired location in the lengthwise direction;

a transverse releasable locking device for releasably locking the transverse adjustment assembly relative to the worktable at a desired location in the transverse direction;

a vertical releasable locking device for releasably locking the vertical adjustment assembly relative to the work table at a desired location in the vertical direction;

a pivot which pivotally mounts the hold-down member to the adjustment device for pivoting movement; and a spring for biasing the hold-down member with a biasing force in a first pivot direction about said pivot such that said arcuate cam surface is biased in a direction opposite to a feed direction of said workpiece and into engagement with the upper surface of the workpiece, wherein said lengthwise adjustment assembly includes at least first and second lengthwise adjustment members, the first lengthwise adjustment member being received within an interior portion of the second lengthwise adjustment member; and wherein a hold-down member having a main body, and an arcuate cam surface at one edge of the main body for engaging an upper surface of a workpiece on the work table.

* * * * *